US006731990B1

(12) United States Patent
Carter et al.

(10) Patent No.: US 6,731,990 B1
(45) Date of Patent: *May 4, 2004

(54) PREDICTING VALUES OF A SERIES OF DATA

(75) Inventors: Malcolm Edward Carter, Herts (GB); Otakar Fojt, York (GB); Michael Maurice Dodson, Heslington (GB); Jason Levesley, Southbank (GB); Christopher Hobbs, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/493,167

(22) Filed: Jan. 27, 2000

(51) Int. Cl.[7] ............................................... G05B 13/02
(52) U.S. Cl. ............................ 700/52; 706/21; 702/189
(58) Field of Search ....................... 700/51–54; 706/21; 702/189

(56) References Cited

U.S. PATENT DOCUMENTS

| 5,144,549 A | * | 9/1992 | Youcef-Toumi .............. 700/52 |
| 5,257,206 A | * | 10/1993 | Hanson ...................... 700/273 |
| 5,446,828 A | * | 8/1995 | Woodall ....................... 706/25 |
| 5,510,976 A | | 4/1996 | Tanaka et al. ................. 700/54 |
| 5,748,851 A | * | 5/1998 | Iokibe et al. .................. 706/58 |
| 5,884,037 A | * | 3/1999 | Aras et al. ................... 709/226 |
| 5,890,142 A | * | 3/1999 | Tanimura et al. ............. 706/12 |
| 6,125,105 A | * | 9/2000 | Edwards et al. ............ 370/230 |
| 6,336,050 B1 | * | 1/2002 | Amin et al. ................... 700/28 |
| 6,370,437 B1 | * | 4/2002 | Carter et al. .................. 700/52 |
| 2001/0013008 A1 | * | 8/2001 | Waclawski .................... 705/10 |

FOREIGN PATENT DOCUMENTS

| JP | 8314530 | 11/1996 | .......... G05B/23/02 |
| JP | 2001014295 A | * 1/2001 | .......... G06F/17/00 |

OTHER PUBLICATIONS

Holger, Kantz and Thomas Schreiber, "Non Linear time series analysis" pp. 44 to 46 Cambridge nonlinear science series 7, 1997, Cambridge University Press.

The Theory of Deterministic Chaos and its Application in Analysis of Endoscopic sympathectomy data. Pages 58 to 65 and 68 to 73. Doctoral Thesis, Otakar Fojt, Brno University, Czech Republic, Dec. 1997.

"Obtaining Order in a World of Chaos" Abarbanel, Frison and Tsimring IEEE Signal Processing Magazine, May 1998 pp. 49 to 65.

* cited by examiner

Primary Examiner—John A. Follansbee
Assistant Examiner—Crystal J Barnes
(74) Attorney, Agent, or Firm—Barnes & Thornburg

(57) ABSTRACT

Communications data such as traffic levels in a communications network is analysed using techniques adapted from the study of chaos. Future values of a series of communications data are predicted and an attractor structure is determined from the communications data. This enables the communications processes to be monitored, controlled and analysed. Action can be taken to modify the communications process using the results from the prediction and attractor structure to reduce costs and improve performance and efficiency. These methods may also be used for product data from manufacturing processes. An algorithm bank is compiled containing prediction algorithms suitable for different types of data series, including those exhibiting deterministic behaviour and those exhibiting stochastic behaviour. Recent past values of a data series are taken and assessed or audited in order to determine which of the algorithms in the bank would provide the optimal prediction. The selected algorithm is then used to predict future values of the data series. The assessment or auditing process is carried out in real time and a prediction algorithm selected using a "smart switch" such that different algorithms are used for different stages in a given series as required. This enables good prediction of data series which change in nature over time to be obtained.

44 Claims, 30 Drawing Sheets

FLAGS TRUTH TABLE AND INTERPRETATION

| Prediction | | Result Condition | | Change | | Interpretation | Flag Opportunity |
|---|---|---|---|---|---|---|---|
| Met | Not Met | Good | Bad | Large | Small | | |
| 1 | | 1 | | 1 | | In Control but risks present<br>Ok if change deliberated otherwise<br>Not in control and new influence | Quality Measure<br>Change effectiveness or quality measure |
| | 1 | 1 | | 1 | | | |
| 1 | | | 1 | 1 | | In control and need for improvement<br>Not in control and new influence | Quality measure<br>Conditions change |
| | 1 | | 1 | 1 | | | |
| 1 | | 1 | | 1 | | In control and low risk<br>Ok if change deliberate otherwise<br>Not in control and new influence | Quality measure<br>Change effectiveness or quality measure |
| | 1 | 1 | | 1 | | | |
| 1 | | | 1 | | 1 | In control and need for improvement<br>Not in control and new influence | Quality measure<br>Conditions Change |
| | 1 | | 1 | | 1 | | |

*Fig. 8b*

| X1 | X2 | X3 | X4 | X5 | X6 | X7 | X8 | ... | X26 |
|----|----|----|----|----|----|----|----|-----|-----|
| X2 | X3 | X4 | X5 | X6 | X7 | X8 | X9 | ... | X27 |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| ... | ... | ... | ... | ... | ... | ... | ... | | ... |
| X1000 | X1001 | X1002 | X1003 | X1004 | X1005 | X1006 | X1007 | ... | X1026 |

PREDICTING VALUES OF A SERIES OF DATA

BACKGROUND OF THE INVENTION

1. Field of the Invention

This invention relates to a computer system and method for predicting a future value of a series of data and in particular, but in no way limited to, a computer system and method for predicting a future value of a series of communications data or product data.

2. Description of the Prior Art

Predicting future values of a series of data is a difficult problem that is faced by managers and operators of processes and systems such as communications networks or manufacturing processes. For example, a communications network has a limited capacity and traffic levels within that network need to be managed effectively to make good use of the available resources whilst minimising congestion. However, previously, methods of predicting future values of data series such as communications data or product data have not been accurate enough to be used effectively. Another problem is that such methods of predicting are often computationally expensive and time consuming such that predicted values are not available far enough in advance to be useful.

Network and service providers typically enter into contracts with customers in which specified quality of service levels and other metrics are defined. Penalty payments are incurred in the event that these agreed service levels and metrics are not met and this is another reason why predicting future values of data series, such as communications data is important. By using such predicted values better management of communications network resources could be made such that contractual agreements are met.

Previously the approach of statistical process control (SPC) has been used to analyse data series. Data samples were obtained, such as traffic levels in a communications network at a particular time and data from these samples would then be used to make inferences about the whole population of traffic level data over time for the communications network. Typically, statistics such as the mean and standard deviation or range were calculated for the sample data for each parameter, and these statistics compared for different samples. For example, if the mean was observed to move outside a certain threshold range an "out of control" flag would be triggered to alert the network operators to a problem in the communications network. If trends were observed in the data, for example, an increase in the mean, the operator could be alerted to this fact and then an investigation carried out.

Several problems with these statistical approaches are known. For example, an inference is made that the data sets fit a standard type of distribution, such as a normal or Poisson distribution. However, this is rarely the case for communications network data in which many outlying values are typically observed and which are often bimodal or show other irregular distributions. Also, data may be obtained from a small sample of the actual data series and used to make inferences about the whole population of data. This means that the statistics calculated are often not an accurate reflection of the process being analysed.

Another problem is that data that is available is often not suitable for statistical analysis. This is because the data sets are often small, incomplete, discontinuous and because they contain outlying values. However, this type of data is typically all that is available for communications network management, process control or other purposes.

The problems mentioned above also apply to process control and to data series of product data. Another problem in process control is being able to deal with the fact that the inputs to the process vary. For example, if components are supplied to a manufacturer for assembly into a final product, those components may vary from batch to batch and from supplier to supplier. However, it is very difficult to analyse how the components vary and this is time consuming and expensive. Also, it is difficult to determine what effect variations in the components may have on the manufacturing process that is being controlled. These problems increase for more complex products that involve many components, such as circuit boards. For this reason, many manufacturers aim to limit variability by attempting to strictly control all the initial build conditions which includes the supply base. This is often not possible if it is necessary to vary the supplier for other reasons, for example to attain a good price or to achieve continuity of supply. Many manufacturers of electronic systems rely heavily upon their suppliers to ensure that materials and components used in the fabrication of products are compliant to specification. Often, electronic components are not examined before they enter factories. Investment programmes for test equipment at the component level have shown that it is not practical to distinguish between batches of components and also that the instances of non-compliant components are negligible. For these reasons many manufacturing companies have wound down their incoming component inspection processes. Instances do occur where manufactured products exhibit changes in performance that are attributed to changes in the components but no effective way of dealing with this problem has been found.

A particular problem in process control involves the situation where a manufacturing process is set up in a particular location, such as the USA, and it is required to set up the same process in a new location, say Canada, in order to produce the same quality of product with the same efficiency. It is typically very difficult to set up the new process in such a way that the same quality of product is produced with the same efficiency because of the number of factors that influence the process.

Failure mode effect analysis is another problem in management of communications networks, communications equipment, or in process control. In this case, a failure occurs in the process and it is required to analyse why this has occurred and what corrective action should be taken. Current methods for dealing with failure mode effect analysis include schematic examination and fault injection techniques but these are not satisfactory because of the problems with the data mentioned above.

JP8314530 describes a failure prediction apparatus which uses chaos theory based methods. A physical quantity, such as an electrical signal, showing the condition of a single installation is measured repeatedly at regular intervals in order to collect a time series of data. This time series of data is then used to reconfigure an attractor which is used to predict future values of the time series. These predicted values are compared with observed values in order to predict failure of the installation. This system is disadvantageous in many respects. The input data must be repeated measurements from a single apparatus taken at regular intervals. However, in practice it is often not possible to obtain measurements at regular intervals. Also, JP8314530 does not address the problems of dealing with communications data, product data and non time series data such as product data obtained from many products which will vary. Also, JP8314530 is concerned with failure prediction only and not with other matters such as monitoring performance and detecting changes in behaviour of a process. Moreover, JP8314530 does not describe the process of identifying nearest neighbour vectors and determining corresponding vectors for these.

It is accordingly an object of the present invention to provide a computer system and method for predicting a future value of a series of data which overcomes or at least mitigates one or more of the problems noted above.

SUMMARY OF THE INVENTION

According to a first aspect of the present invention there is provided a method of predicting a future value of a series of data comprising the steps of:

(i) forming a set of vectors wherein each vector comprises a number of successive values of the series of data;

(ii) identifying from said set of vectors, a current vector which comprises a most recent value of the series of data;

(iii) identifying at least one nearest neighbour vector from said set of vectors, wherein for each nearest neighbour vector a measure of similarity between that nearest neighbour vector and the current vector is less than a threshold value;

(iv) for each nearest neighbour vector, determining a corresponding vector, each corresponding vector comprising values of the series of data that are a specified number of data values ahead of the data values of the nearest neighbour vector in said series of data; and (v) calculating the predicted future value on the basis of at least some of the corresponding vector(s); wherein said series of data comprises either a plurality of values each measured from a different product or a series of communications data.

A corresponding computer system for predicting a future value of a series of data comprises:

(i) a processor arranged to form a set of vectors wherein each vector comprises a number of successive values of the series of data;

(ii) an identifier arranged to identify from said set of vectors, a current vector which comprises a most recent value of the series of data;

(iii) a second identifier arranged to identify at least one nearest neighbour vector from said set of vectors, wherein for each nearest neighbour vector a measure of similarity between that nearest neighbour vector and the current vector is less than a threshold value;

(iv) a determiner arranged to determine, for each nearest neighbour vector, a corresponding vector, each corresponding vector comprising values of the series of data that are a specified number of data values ahead of the data values of the nearest neighbour vector in said series of data; and (v) a calculator arranged to calculate the predicted future value on the basis of at least some of the corresponding vector(s); wherein said series of data either comprises a plurality of values each measured from a different product or a series of communications data.

This provides the advantage that product data from a manufacturing process, or communications data can be analysed and used to provide a prediction about performance in the future. This removes any "time lag" between obtaining data about the manufacturing or communications process and allows immediate modification to reduce waste. This reduces costs and improves efficiency. The manufacturing or communications process can be effectively controlled using the data despite the fact that this data may not fit a recognised statistical distribution and is not suitable for statistical analysis. The effects of inputs to the manufacturing or communications process, such as new suppliers or new communications equipment is monitored or controlled without the need to carry out measurements or tests on the inputs. In the case that the manufacturing or communications process fails the failure situation can be analysed by comparing the predicted and actual data.

According to another aspect of the present invention there is provided a method of substantially determining an attractor structure from a series of data comprising the steps of:

(i) forming a set of vectors wherein each vector comprises a number of successive values of the series of data;

(ii) calculating a set of eigenvectors and a set of eigenvalues from said set of vectors using the method of principal components analysis; and (iii) transforming the said set of vectors on the basis of said set of eigenvectors; wherein said series of data either comprises a plurality of values each measured from a different product or comprises a series of communications data.

A corresponding computer system for substantially determining an attractor structure from a series of data comprises:

(i) a processor arranged to form a set of vectors wherein each vector comprises a number of successive values of the series of data;

(ii) a calculator arranged to calculate a set of eigenvectors and a set of eigenvalues from said set of vectors using the method of principal components analysis; and (iii) a transformer arranged to transform the said set of vectors on the basis of said set of eigenvectors; wherein said series of data either comprises a plurality of values each measured from a different product or comprises a series of communications data.

This provides the advantage that a series of data can be analysed by determining an attractor structure. If no effective attractor structure is identified for a given parameter then this parameter is known not to be a good input for the prediction process. This enables the costs of obtaining data series to be reduced because ineffective data parameters can be eliminated. Another advantage is that two separate manufacturing or communications processes that are intended to produce the same result can be compared by comparing their attractor structures. Adjustments can then be made to the processes until the attractor structures are substantially identical and this helps to ensure that the same quality of product or service is produced.

An algorithm bank is compiled containing prediction algorithms suitable for different types of data series, including those exhibiting deterministic behaviour and those exhibiting stochastic behaviour. Recent past values of a data series are taken and assessed or audited in order to determine which of the algorithms in the bank would provide the optimal prediction. The selected algorithm is then used to predict future values of the data series. The assessment or auditing process is carried out in real time and a prediction algorithm selected using a "smart switch" such that different algorithms are used for different stages in a given series as required. This enables good prediction of data series which change in nature over time to be obtained. The assessment method allows a level of deterministic behaviour of the data series to be determined quickly and in a computationally inexpensive manner. The data series may contain outlying values, noise, and contain samples separated by irregular intervals. Any suitable type of data may be used such as communications data or product data. For example, traffic levels at a node in a communications network are successfully predicted using the method.

According to a first aspect of the present invention there is provided a method of predicting one or more future values of a series of data, said method comprising the steps of:
  selecting a plurality of past values of said series of data;
  assessing the level of deterministic behaviour of said series of data on the basis of said selected plurality of past values;
  selecting a predictive algorithm from a store of predictive algorithms on the basis of said assessment of the level of deterministic behaviour of the series of data; and
  using said selected predictive algorithm to predict said one or more future values of the series of data.

A corresponding computer system is provided for predicting one or more future values of a series of data, said computer system comprising:
  an input arranged to accept a plurality of past values of said series of data;
  a processor arranged to assess the level of deterministic behaviour of said series of data on the basis of said selected plurality of past values;
  an input arranged to access a store of predictive algorithms and wherein said processor is further arranged to select one of said predictive algorithms on the basis of said assessment of the level of deterministic behaviour of the series of data; and
  an output arranged to provided one or more future values of the series of data obtained by using said selected predictive algorithm.

A corresponding computer program is provided, stored on a computer readable medium, said computer program being arranged to control a computer system for predicting one or more future values of a series of data, said computer program being arranged to control said computer system such that:
  a plurality of past values of said series of data is accepted;
  an assessment of the level of deterministic behaviour of said series of data is made on the basis of said selected plurality of past values;
  a store of predictive algorithms is accessed and one of said predictive algorithms selected on the basis of said assessment of the level of deterministic behaviour of the series of data; and
  one or more future values of the series of data are obtained by using said selected predictive algorithm.

This provides the advantage that data, such as data from a communications process can be analysed and used to provide a prediction about performance of the process in the future. For example, the data may relate to traffic levels in a communications network. The selection of appropriate predictive algorithms in this manner may be carried out dynamically whilst a stream of data is being received and future values predicted. Advantageously, changes in the nature of the data are accommodated because different predictive algorithms are selected, in real time if required, and used to provide an optimal prediction at all times.

According to another aspect of the present invention there is provided a method of assessing a level of deterministic behaviour of a series of data comprising the steps of:

Using a predictive algorithm to predict a value of said data series which corresponds to a past value of said data series, said prediction being made on the basis of a subset of said past values;
  Repeating said step (i) immediately above a plurality of times using the same predictive algorithm and wherein said subset of said past values is larger for successive repetitions of said step (i); and
  Assessing the effect of the size of said subset of past values on the performance of said predictive algorithm.

A corresponding computer system is provided for assessing a level of deterministic behaviour of a series of data said computer system comprising:
  (i) A processor arranged to use a predictive algorithm to predict a value of said data series which corresponds to a past value of said data series, said prediction being made on the basis of a subset of said past values; and
  (ii) Wherein said processor is further arranged to repeat said step (i) immediately above a plurality of times using the same predictive algorithm and where said subset of said past values is larger for successive repetitions of said step (i); and
  (iii) Wherein said processor is further arranged to assess the effect of the size of said subset of past values on the performance of said predictive algorithm.

This provides the advantage that it is possible to assess a level of deterministic behaviour of a series of data quickly and easily. Once this level of deterministic behaviour is determined it is possible to analyse or treat the data whilst taking into account this level of deterministic behaviour. For example, an appropriate algorithm for predicting future values of the data series can be chosen. It is also possible to assess the level of deterministic behaviour in a computationally inexpensive manner which may be calculated in real time.

BRIEF DESCRIPTION OF THE DRAWINGS

FIG. 8b is an example of a look up table for various combinations of predicted and actual results.

DETAILED DESCRIPTION OF THE INVENTION

Embodiments of the present invention are described below by way of example only. These examples represent the best ways of putting the invention into practice that are currently known to the Applicant although they are not the only ways in which this could be achieved.

Definitions product data—product data comprises information about items produced from a manufacturing process. The items may be whole products or components of products.

Communications data—information related to communication between parties, for example, information about a communications process, part of a communications process or operation of communications equipment.

series of data—an ordered number of items of information obtained by observing a process where the intervals between the items of information are not necessarily regular.

current vector—a vector which represents the current observation in a series of data, or an observation in the series of data after which a prediction is required.

It has unexpectedly been discovered that communications data, such as the rate of packet arrival at a switch, exhibits both stochastic and deterministic properties and can successfully be analysed using methods adapted from chaotic systems analysis. For example, such data series are found in communications network backbone nodes. By "switching" between stochastic and deterministic prediction algorithms on the basis of a real time audit of recent past values of the data series, prediction of future values of the data series is improved. Before now, real time assessment of the level of deterministic behaviour exhibited by a data series has not been possible. Once the improved predicted values of the data series are obtained these may be used for communications network management, such as traffic management and for any other suitable process.

Figure 25:
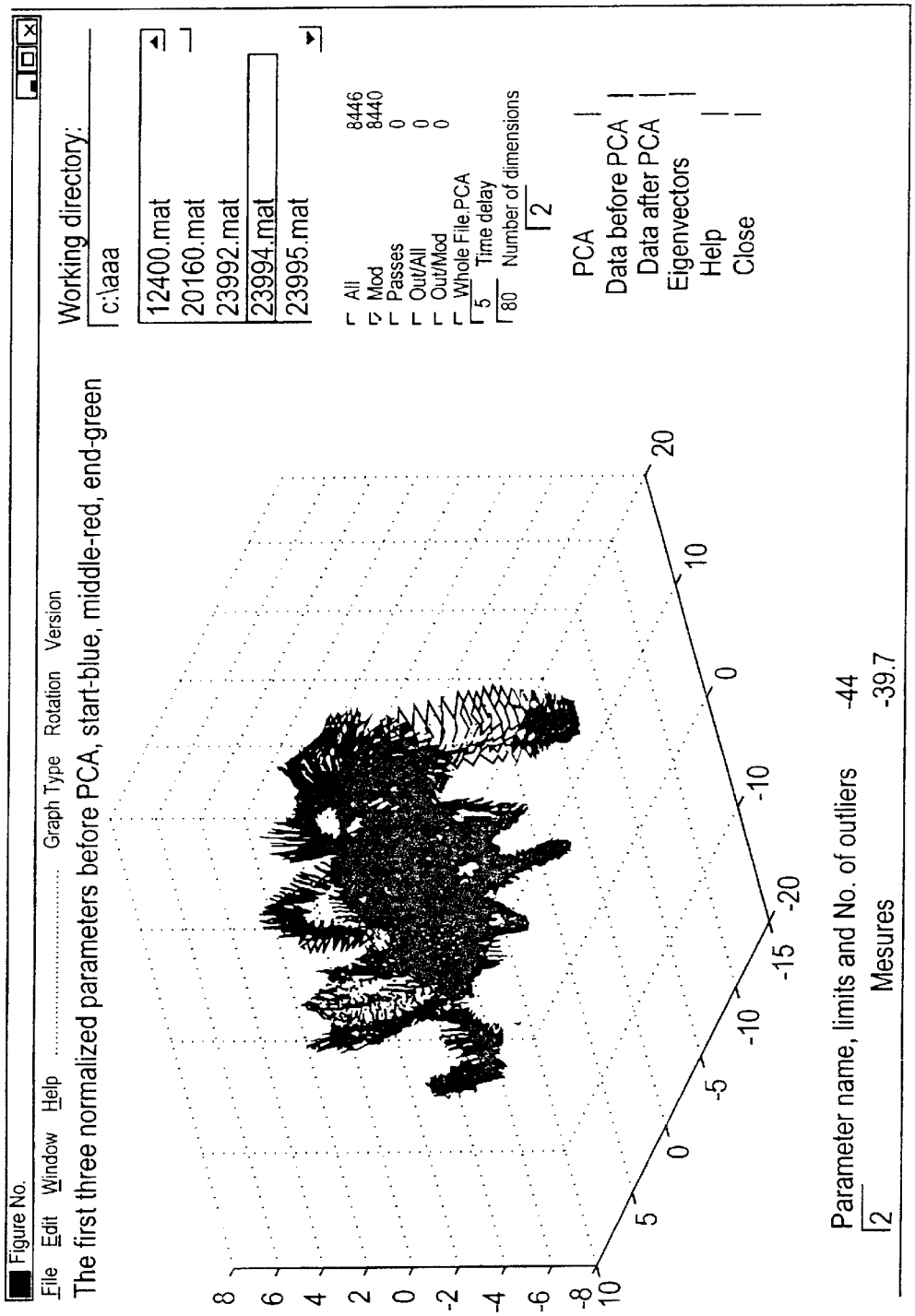
FIG. 25 is a graph of a series of data after principal component analysis in which the form of the graph indicates that the data series is generally deterministic.

It has unexpectedly been found that communications data such as the rate of arrival of packets at a node in a communications network can reveal attractor structures. For example, FIG. 25 shows an example of an attractor structure of a form similar to that revealed from communications data.

The description below relates to a method of predicting future values of a series of product data such as quality control data from a manufacturing process and is taken from co-pending U.S. patent application Ser. No. 09/243,303 U.S. Pat. No. 6,370,437. Also described in a method of determining an attractor structure from a series of product data. It has unexpectedly been discovered that these methods are equally applicable to communications data such as the rate of arrival of packets at a node in a communications network or fluctuation of bandwidth levels at a link in a communications network. Thus even though the description below refers to product data series it also applies to other data series.

Chaotic systems are deterministic but are very sensitive to initial conditions. For example, in a chaotic system, a small random error grows exponentially and can eventually completely alter the end result. Given an initial state for a chaotic system it becomes essentially impossible to predict where the state will reside in say 40 iterations hence. However, short term prediction for chaotic systems is not ruled out.

Figure 11:
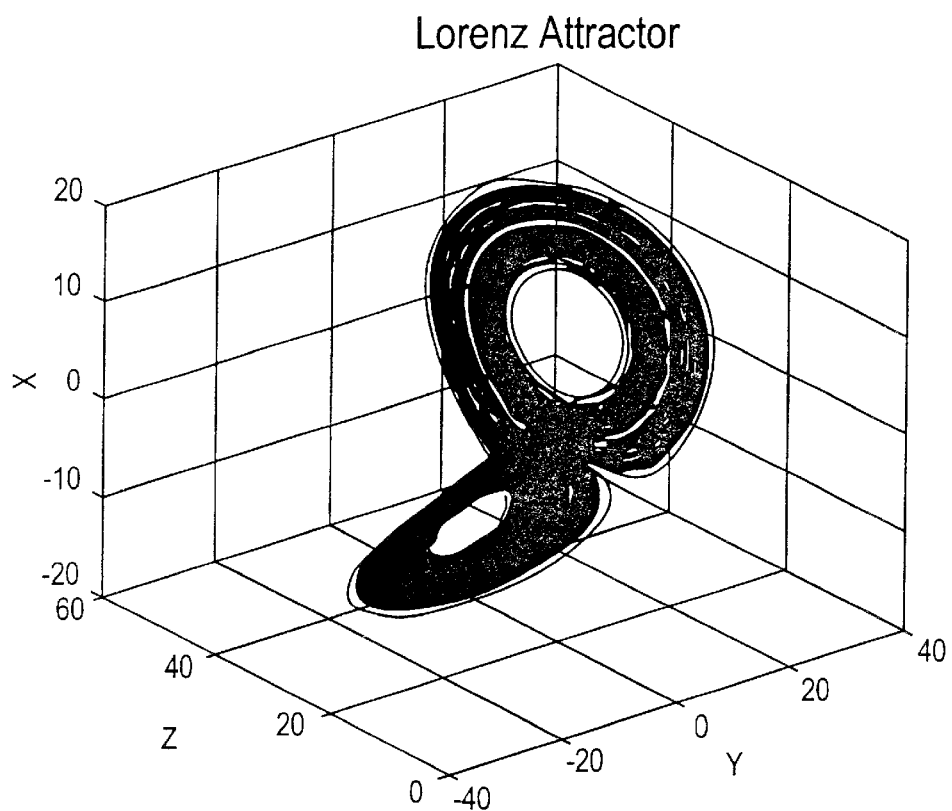
FIG. 11 illustrates the structure of the known Lorenz attractor.
Figure 16A:
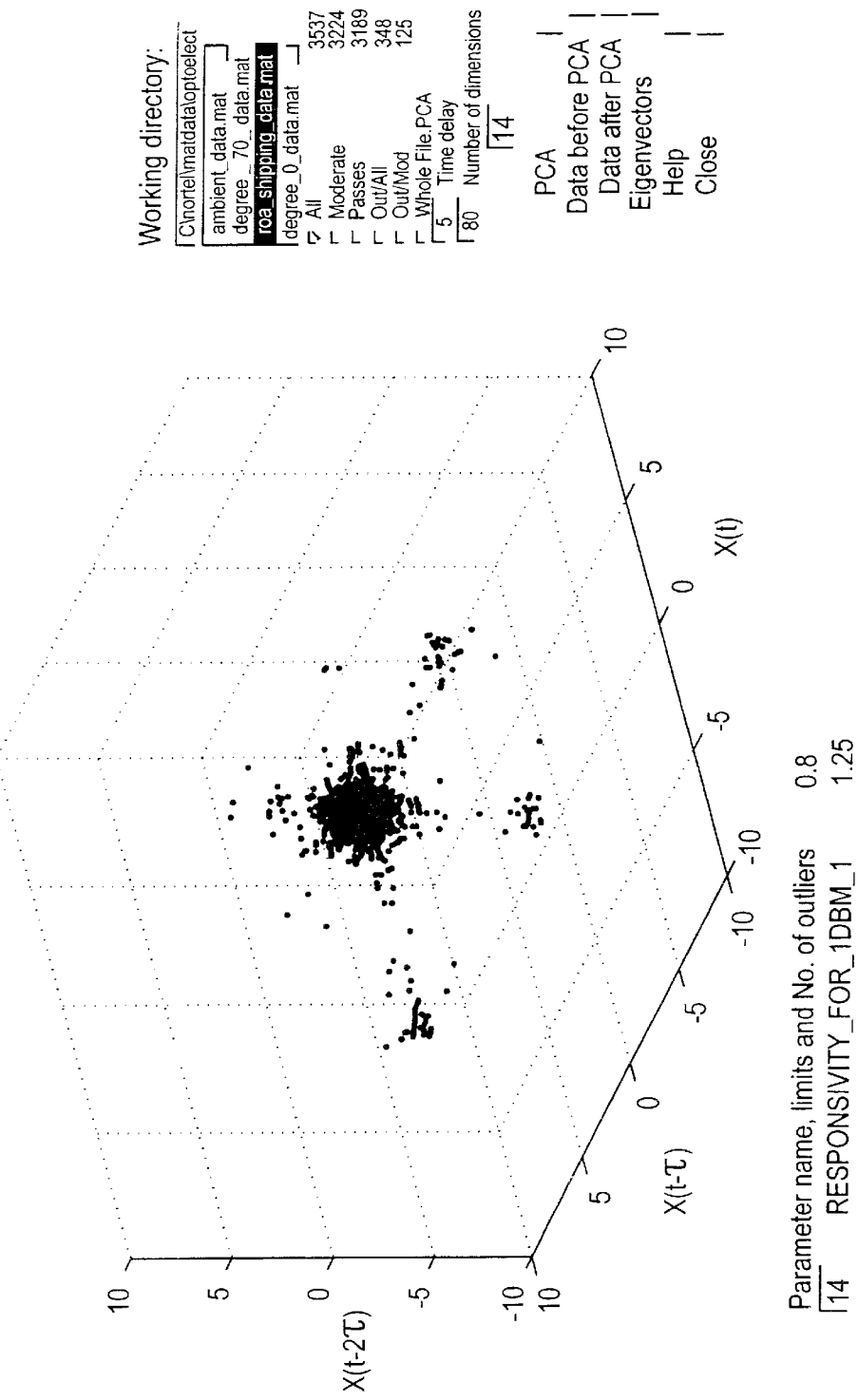
FIG. 16a is an example of a display from the principal components analysis program showing the data before application of the principal components analysis.
Figure 16B:
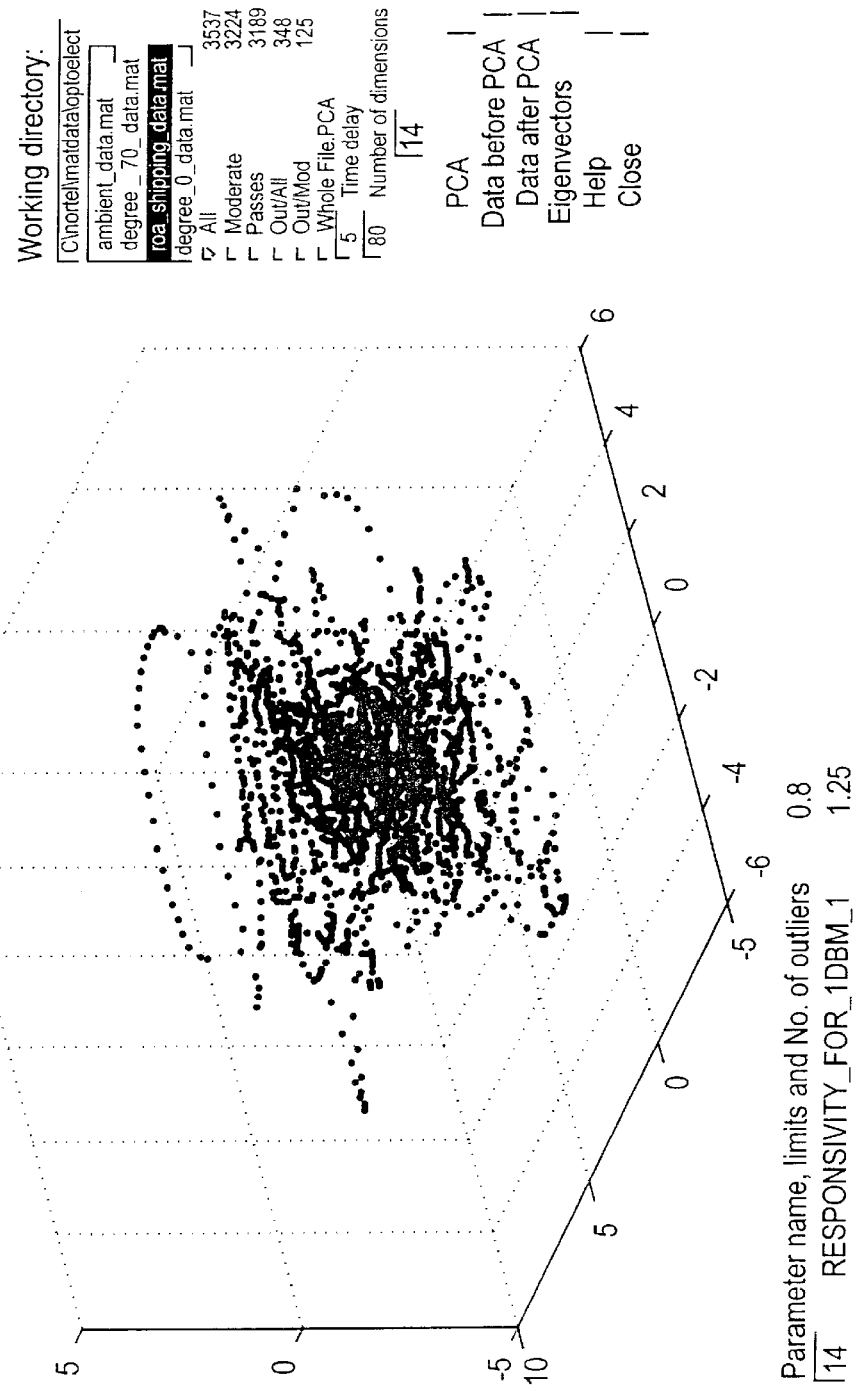
FIG. 16b is an example of a display from the principal components analysis program showing the data after application of the principal components analysis.

A chaotic system typically produces a time series that appears complex, irregular and random. However, the behaviour of a chaotic system can often be described by an attractor which is a bounded subset of a region of phase space, as is known to the skilled person in the art. An example of a known attractor, the Lorenz attractor is shown in FIG. 11. It has unexpectedly been found that product data can reveal attractor structures. For example, FIG. 16b shows an example of an attractor structure revealed from product data.

In the present invention, a factory or manufacturing process is assumed to be a non-linear close coupled dynamical system. Product data from the manufacturing process is assumed to contain information about the dynamical system and is analysed using techniques adapted from dynamical systems analysis. Ideally, the controller of a manufacturing process desires the manufacturing process to fit a fixed, periodic or quasiperiodic function. In this situation, the manufacturing process is easy to monitor and control because the process fits a simple function. However this is not the case in practice where it is found that manufacturing processes are very difficult to control and predict. It has unexpectedly been found that product data sometimes show characteristics of low order chaotic systems where the order of the system is between about 3 and 8. In this situation, global stability but local instability is observed, with sensitive dependence on initial conditions and with divergence of nearby trajectories in the attractor structure.

Figure 1:
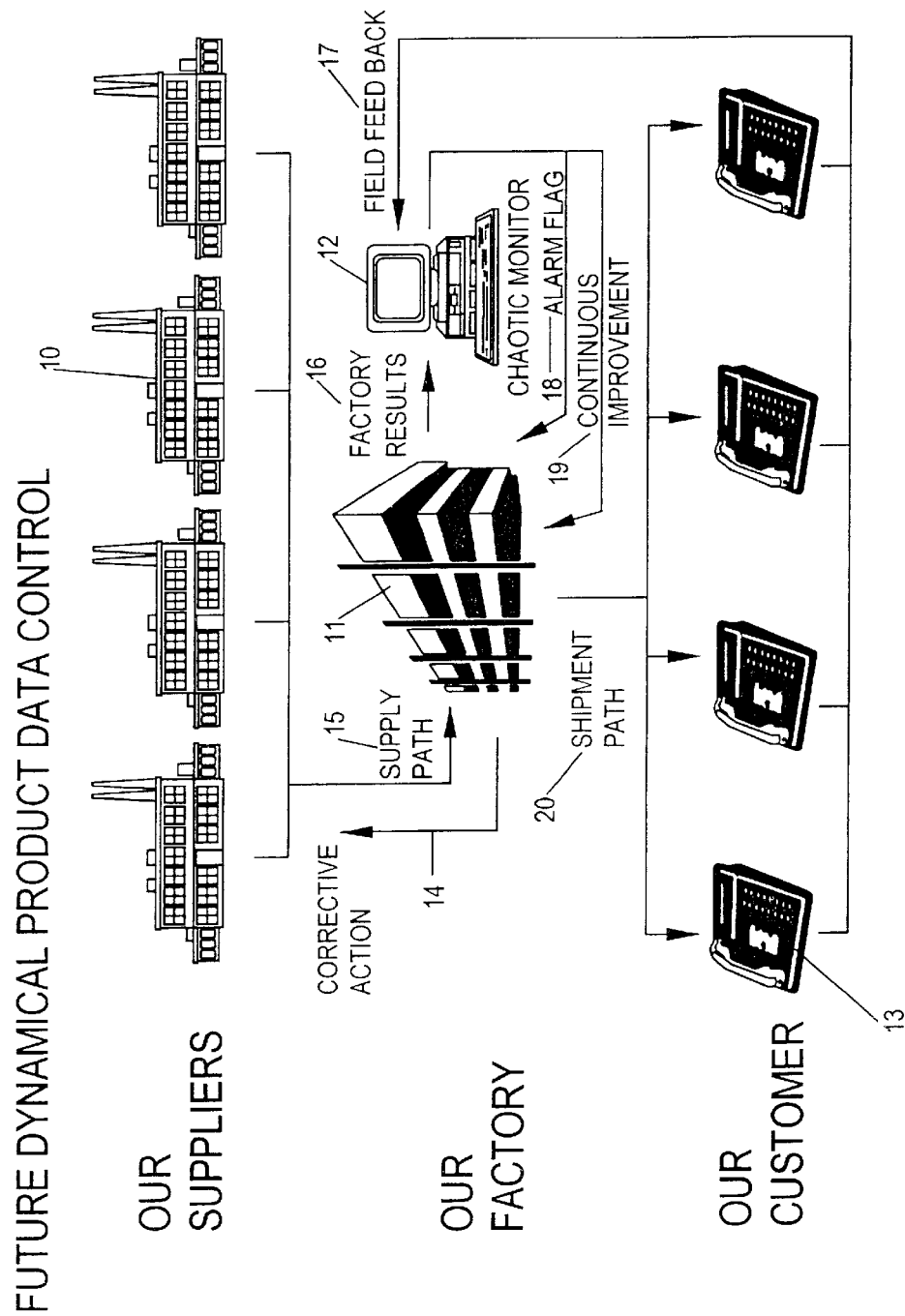
FIG. 1 is a schematic flow diagram of a manufacturing process.

FIG. 1 shows how the invention is used to monitor results from a factory. Suppliers 10 provide components to a factory 11 via a supply path 15. The factory 11 assembles the components to form products. Each product is measured or tested to obtain values of one or more parameters. These measurements comprise part of a number of factory results 16. The factory results 16 comprise any information related to the performance and output of the manufacturing process. For example, factory results 16 can comprise information about events in the factory and information about suppliers and any other factors which affect the manufacturing process.

The factory results 16 are provided to a computer system 12 or other suitable information processing apparatus. The computer system analyses the input factory results using techniques adapted from those suitable for analysing data sets that exhibit chaotic behaviour. The factory results form a series of product data. The computer system forecasts future values of that series of product data and then monitors new actual values of the series that are provided as input. The actual and predicted values are compared and on the basis of this comparison one of a number of flags 18 are provided as output from the computer system to a user. For example, these can comprise alarm flags which alert the user to the fact that the factory results 16 differ unexpectedly from the predicted factory results.

The products produced by the factory 11 are provided by a shipment path 20 to customers 13. Information from the customers 13 about the products is fed back to the computer system 12 as shown by field feed back arrow 17 in FIG. 1. This information is analysed by the computer system and used to predict future performance of the manufacturing process.

Outputs from the computer system also comprise descriptions of the process occurring in the factory. On the basis of this information, adjustments are made to the manufacturing process which enables continuous improvements 19 in the manufacturing process to be made. Outputs from the computer system 12 are also used to provide feedback 14 to the suppliers about how their supplies affect the factory results 16.

Determination of Attractor Structure

Figure 2:
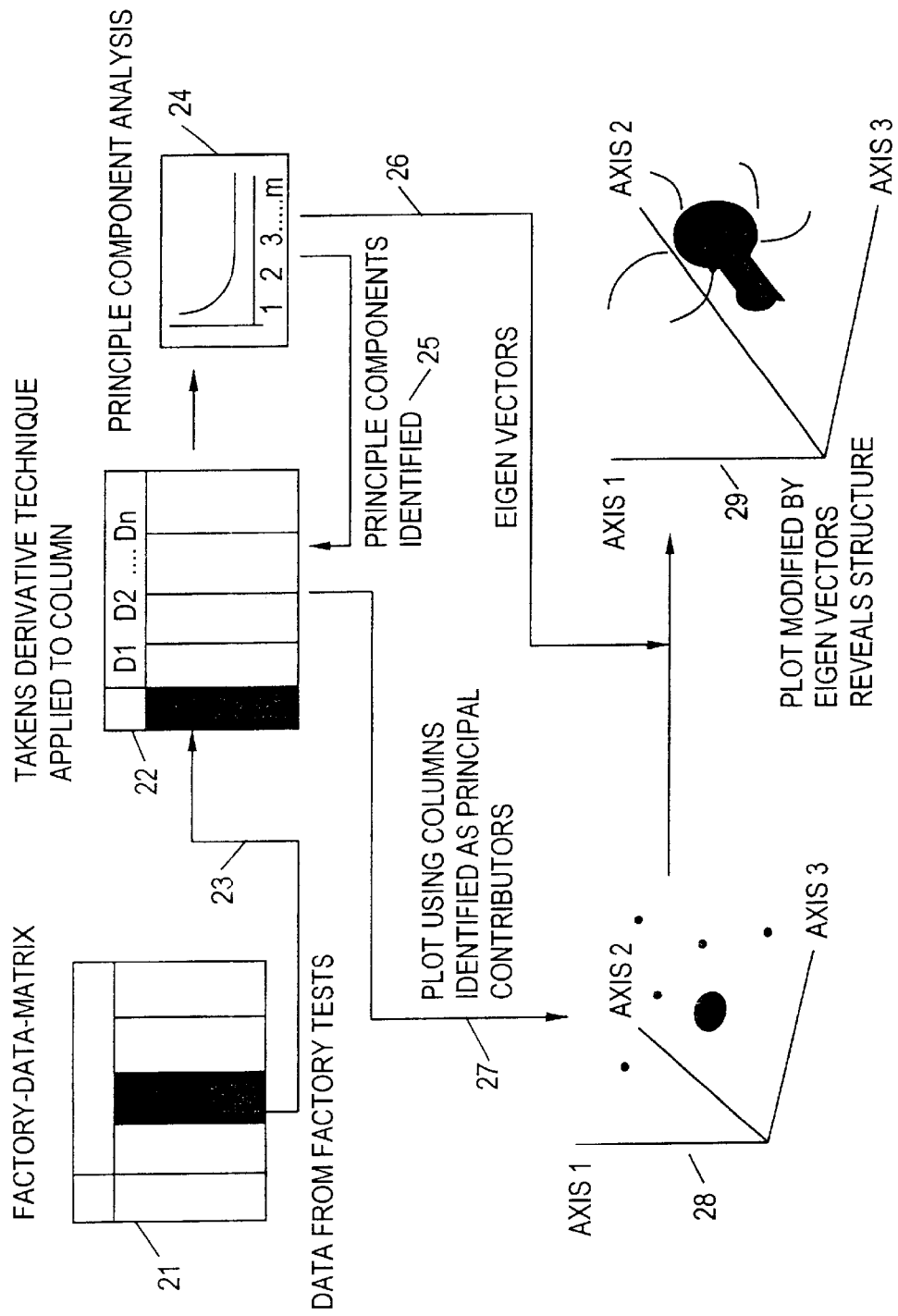
FIG. 2 is schematic flow diagram for a process to determine an attractor structure from a series of product data.

FIG. 2 shows an example of a method to determine from factory data the structure of an attractor. The factory data 21 comprises one or more series of product data. For example, if the products produced in the factory are electric circuits a series may comprise the gain of each circuit produced. The series comprises sequential data but the data does not need to be continuous or to have regular intervals between items in the series. For example, if gains are measured for each circuit produced during a day and then the factory closes for a day, data obtained the next day can still form part of the series already obtained. If another measurement is taken for each electric circuit, for example the impedance, then this could form a second series of product data.

Figure 6:
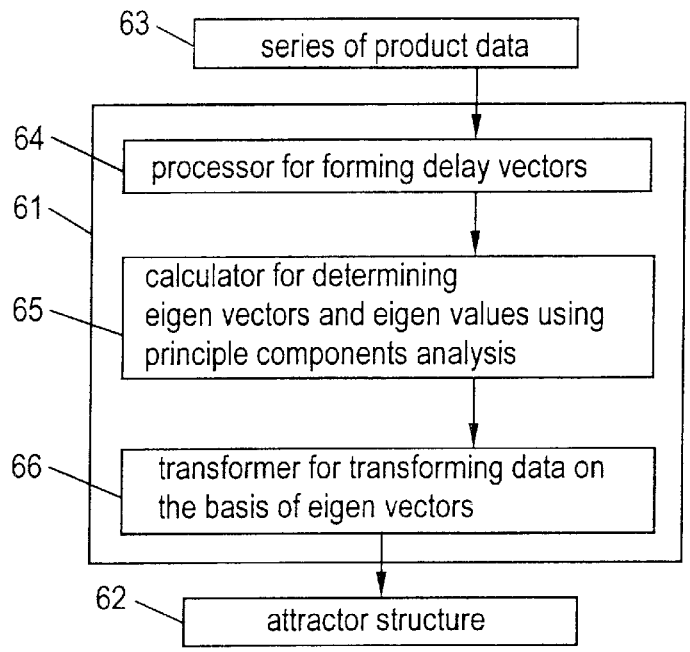
FIG. 6 is a flow diagram for an example of a method to determine an attractor structure from a series of product data.

The factory data 21 is provided in a matrix format as shown in box 21 of FIG. 2 although any other suitable format can be used. Data for a single series are stored in a column of the matrix 21 and then provided as input to a processor which applies a method as illustrated in FIG. 6.

The series of data selected from the factory data matrix 21 is represented in the first column of a matrix 22. From this data, a set of delay vectors are calculated using a particular value of a time delay. The delay vectors are stored in further columns of the matrix 22, such that each column represents the series after said particular time delay has been applied. The method for determining the time delay is described below.

Data from the matrix 22 is then analysed using a method entitled the "method of principal component analysis" as shown in box 24 of FIG. 2. The "method of principal component analysis" is described in detail below.

This provides three matrices, a metric of eigenvectors, a diagonal matrix of eigenvalues and an inverse matrix of eigenvectors. The first three columns of the data from the matrix 22 is taken and plotted to show the 3D structure of the time series as illustrated at 28 in FIG. 2.

The 3D structure is then further revealed by transforming the first three columns of data from matrix 22 using the eigenvectors and then plotting the transformed data, as shown at 29 in FIG. 2.

FIG. 6 shows a computer system 61 for substantially determining an attractor structure 62 from a series of product data 63 comprising:
  (i) a processor 64 arranged to form a set of vectors wherein each vector comprises a number of successive values of the series of product data;
  (ii) a calculator 65 arranged to calculate a set of eigenvectors and a set of eigenvalues from said set of vectors using the method of principal components analysis; and
  (iii) a transformer 66 arranged to transform the said set of vectors on the basis of said set of eigenvectors.

As explained above an ideal manufacturing system is one for which the process is described by a simple function. By describing the attractor structure of a series of product data, the user is able to monitor this structure and adjust the manufacturing process until the attractor structure becomes simpler. In this way the manufacturing process can be improved.

The attractor structure can also be used for warranty returns prediction. That is, some product produced by a manufacturer are returned to the manufacturer because they break down or show other faults whilst the product is still covered by a guarantee provided by that manufacturer. Manufacturers obviously aim to reduce the number of warranty returns as far as possible but it is difficult to predict whether a product that passes all the manufacturers tests after it is produced will fail at some future point in time. By analysing data about returned products using the attractor structure it is sometimes observed that data from the returned products is clustered in particular regions of the attractor structure. If this is the case, the manufacturer is alerted to the fact that future products produced which also relate to that region of the attractor will also be likely to fail in the future.

Predicting Future Value of Product Data

Figure 4:
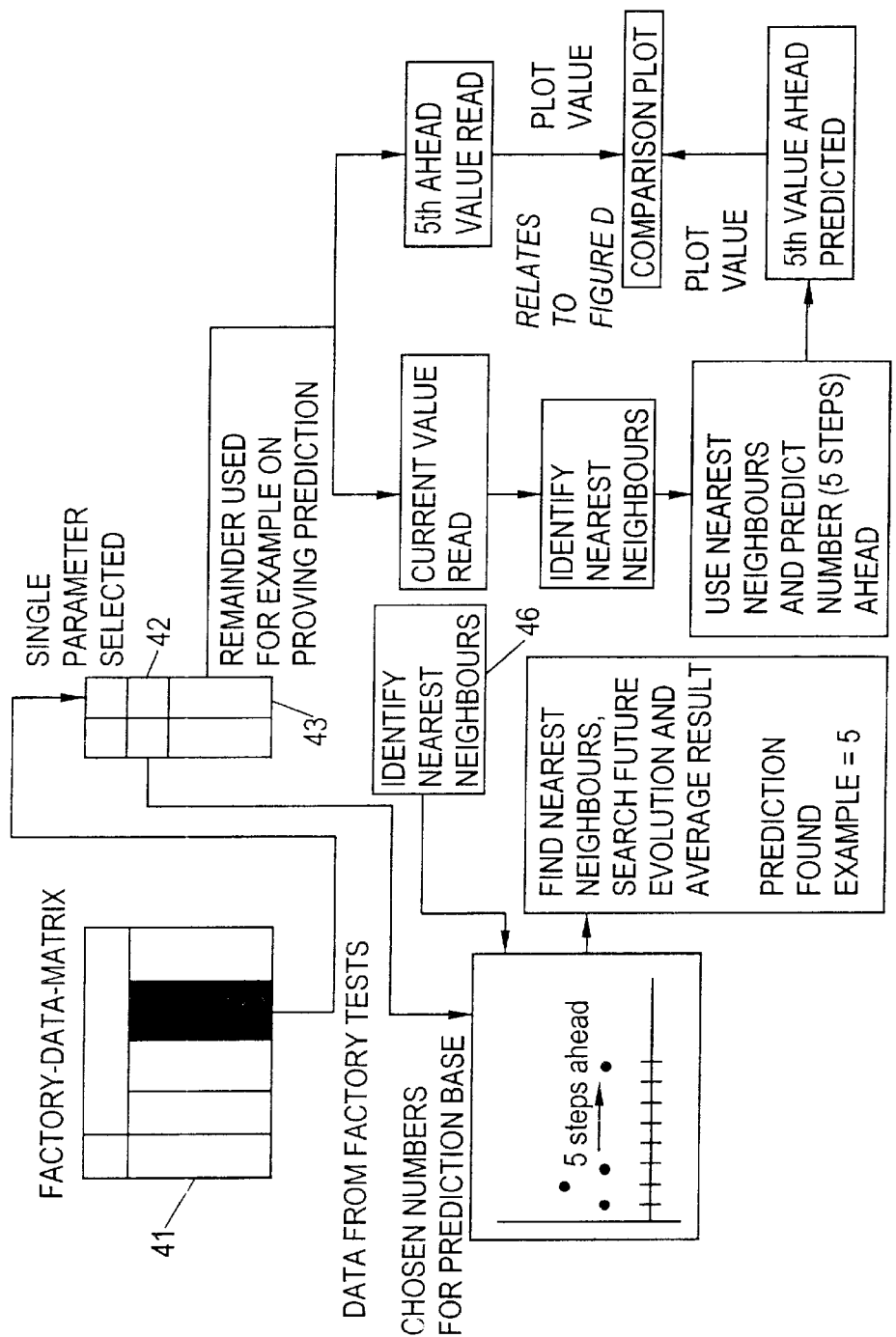
FIG. 4 is schematic flow diagram for a process to predict a future value of a series of product data.

FIG. 4 is an example of a method for predicting future values of a series of factory data. Factory data is provided in the format of a matrix 41 although any other suitable format can be used. Each row in the matrix represents one product produced in a manufacturing process and each column represents a series of factory data. For example, one column can be a series comprising the gain of each of a number of electric circuits produced by a factory. One of the series is taken and data from a first part 42 of this series is used for a learning phase during which a computer system "learns" or analyses the series in order to forecast future values of the series. A remainder part of the series 43 is then used to test the accuracy of the prediction.

Figure 7:
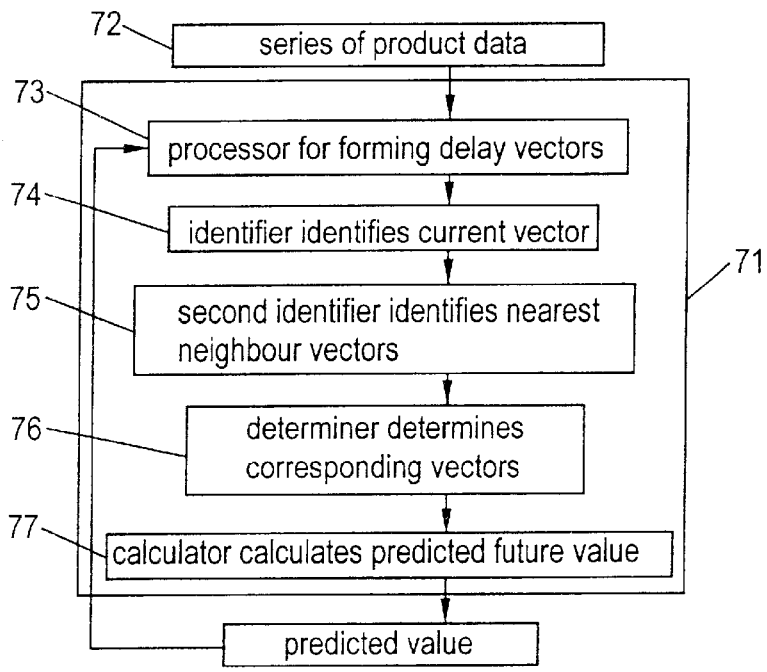
FIG. 7 is a flow diagram for an example of a method to predict a future value of a series of product data.

During the learning phase, data from the first part 42 of the series are analysed using a method as illustrated in FIG. 7. A matrix is formed as illustrated in box 22 of FIG. 2 where each column represents a successive time delay applied to the first part 42 of the series of product data. The time delay is determined as described in detail below. For a current vector, one or more nearest neighbour vectors are determined as shown at box 46. The current vector comprises a most recent value of the first part 42 of the series of product data so that the current vector represents the most recent information about products produced from a manufacturing process. For each nearest neighbour vector, a measure of similarity between that nearest neighbour vector and the current vector is less then a threshold value. The measure of similarity is distance for example. The next stage involves determining a corresponding vector for each nearest neighbour vector. Each corresponding vector comprises values of the series of product data that are a specified number of data values ahead of the data values of the nearest neighbour vector in said series of product data. These corresponding vectors are then used to calculate the predicted future value of the series of product data. For example this can be done by calculating an average of the corresponding vectors. Alternatively, a weighted average of the corresponding vectors can be calculated. For example, the weighting can be arranged so that vectors which relate to earlier times in the series of product data produce less influence on the result that vectors which relate to more recent times in the series of product data. The actual value of the series of product data is obtained, from the remaining part of the series 43, which corresponds to the predicted value, the actual and predicted values are compared. Outputs are then provided to a user on the basis of the actual and predicted values as shown in FIG. 8.

FIG. 7 shows a computer system 71 for predicting a future value of a series of product data 72 comprising:
(i) a processor 73 arranged to form a set of vectors wherein each vector comprises a number of successive values of the series of product data;
(ii) an identifier 74 arranged to identify from said set of vectors, a current vector which comprises a most recent value of the series of product data;
(iii) a second identifier 75 arranged to identify at least one nearest neighbour vector from said set of vectors, wherein for each nearest neighbour vector a measure of similarity between that nearest neighbour vector and the current vector is less than a threshold value;
(iv) a determiner 76 arranged to determine, for each nearest neighbour vector, a corresponding vector, each corresponding vector comprising values of the series of product data that are a specified number of data values ahead of the data values of the nearest neighbour vector in said series of product data; and
(v) a calculator 77 arranged to calculate the predicted future value on the basis of at least some of the corresponding vector(s).

Figure 8A:
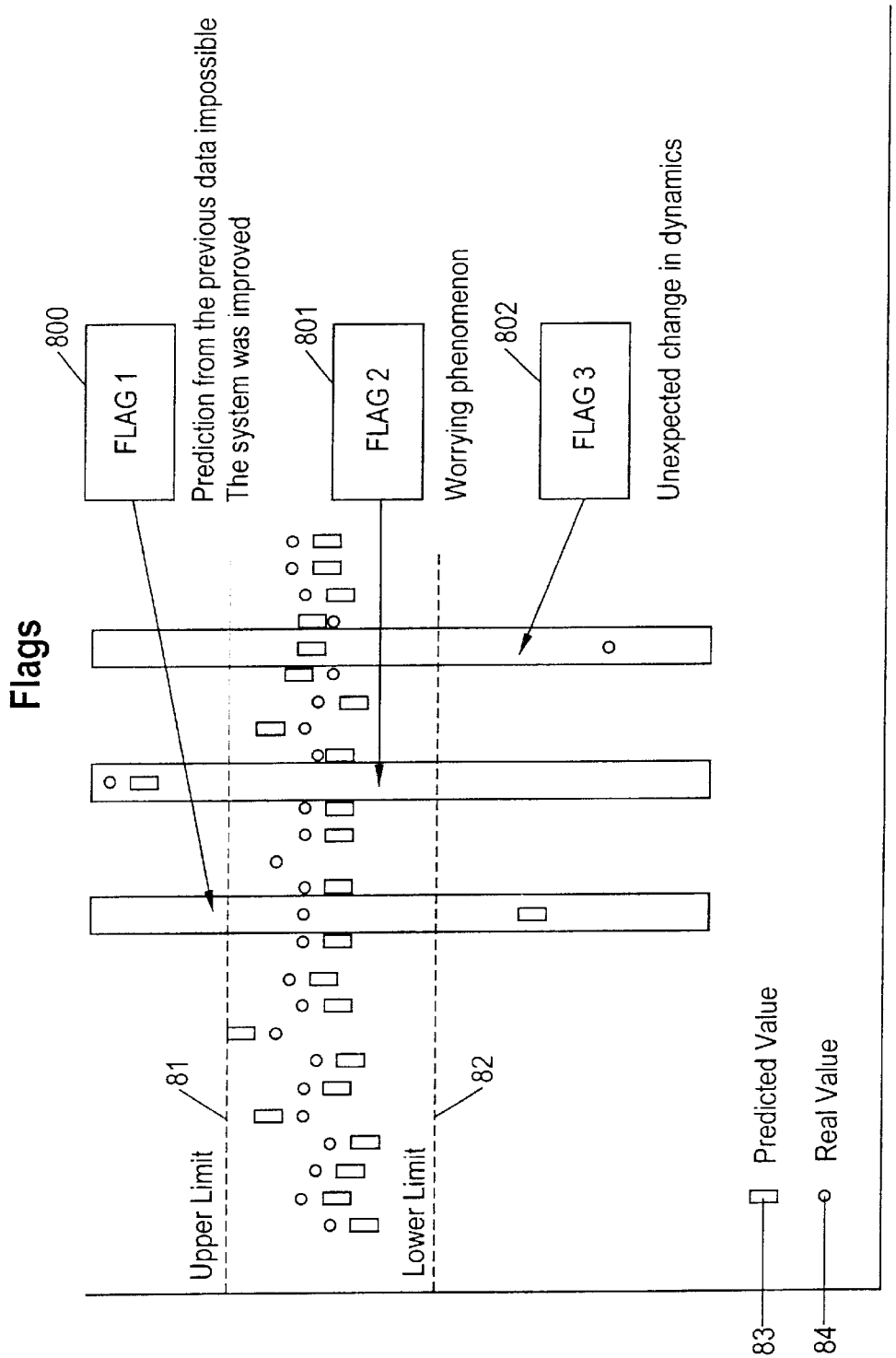
FIG. 8a is a graph of product data value against measurement number which shows predicted and actual values.

FIG. 8a shows a graph of product data values against measurement number. An upper limit 81 and a lower limit 82 are shown and these represent tolerance limits set by the factory controllers; products should fall within these limits otherwise they will be rejected. Predicted values 83 and real or actual values 84 are shown where the predicted values are obtained using a computer system according to the present invention. If the real value is within the tolerance limits but the predicted value is below the lower limit, then flag 1 (800) is presented to the user. In this case the prediction indicated that the manufacturing process was going to produce a product that did not meet the tolerance limits, but the manufacturing process improved. If the real and the predicted value are both above the upper limit 81 then flag 2 (801) is presented to the user. In this case the user is alerted to a worrying phenomenon in the manufacturing process. If the real value is below the lower limit 82 and the predicted value is within the limits then flag 3 (802) is presented to the user. In this case an unexpected change in the dynamics of the manufacturing process has been observed. FIG. 8a shows only one example of a system of flags that can be used to provide the user with information about the manufacturing process. Other methods can also be used to provide this information to the user.

FIG. 8b is an example: of a truth-table for interpretation of the results of the prediction process. The table contains columns which relate to whether the prediction was met 85 or not met 86; whether the condition of the manufacturing process was good 87 or bad 88 (e.g. whether the product data was within the tolerance limits or not); and whether the actual product data had changed by a large 89 or a small 90 amount compared with the previous data value. For all the different combinations of these conditions, an interpretation is given in the column marked 91 and an opportunity flag is given in column 92.

The prediction results can also be combined with other information about the manufacturing process. For example, information about changes in suppliers and batches and about changes in temperature or humidity in the factory are recorded and taken into account with the prediction results. In this way the manufacturing process as a whole is better understood because the effects of changes in the factory, product design, suppliers, and other factors that affect the product are monitored and analysed.

Prediction Method for Data Series Which Show Deterministic Behaviour

A method for predicting future values of a series of data is now described in detail. In this example, a time delay $\tau$ is referred to as "v". The series of data are scalar measurements:

$$s_n = s(X_n), n=1, \ldots, N,$$

A delay reconstruction is used to obtain vectors equivalent to the original ones (these vectors are referred to as delay vectors):

$$s_n = (s_{n-(m-1)v}, s_{n-(m-2)v}, \ldots, s_{n-v}, s_n).$$

This procedure introduces two adjustable parameters into the prediction method (which is in principle parameter free): a delay time v and an embedding dimension m. Choose a delay time v and an embedding dimension m. For all measurements $s_1, \ldots, s_N$ available so far, construct the corresponding delay vectors $s_{(m-1)v+1}, \ldots, s_N$. In order to predict a future measurement $s_{N+\Delta n}$, choose the value of a parameter e of the order of the resolution of the measurements and form a neighbourhood $U_e(s_N)$ of radius e around the point $s_N$. For all points $s_n \in U_e(s_N)$, that is, all points closer than e to $s_N$ (i.e. the nearest neighbours), look up the individual "predictions" $s_{n+\Delta n}$. The finally accepted prediction is then calculated as the average of all these individual predictions:

$$s_{n+\Delta n} = 1/|Ue(s_N)| \Sigma s_{N+\Delta n}.$$

$$s_{n\epsilon}U_\epsilon(s_N)$$

Here $|Ue(s_N)|$ denotes the number of elements of the neighbourhood $Ue(sN)$. If no nearest neighbours closer than e are found then the value of e is increased until some nearest neighbours are found.

Figure 9:
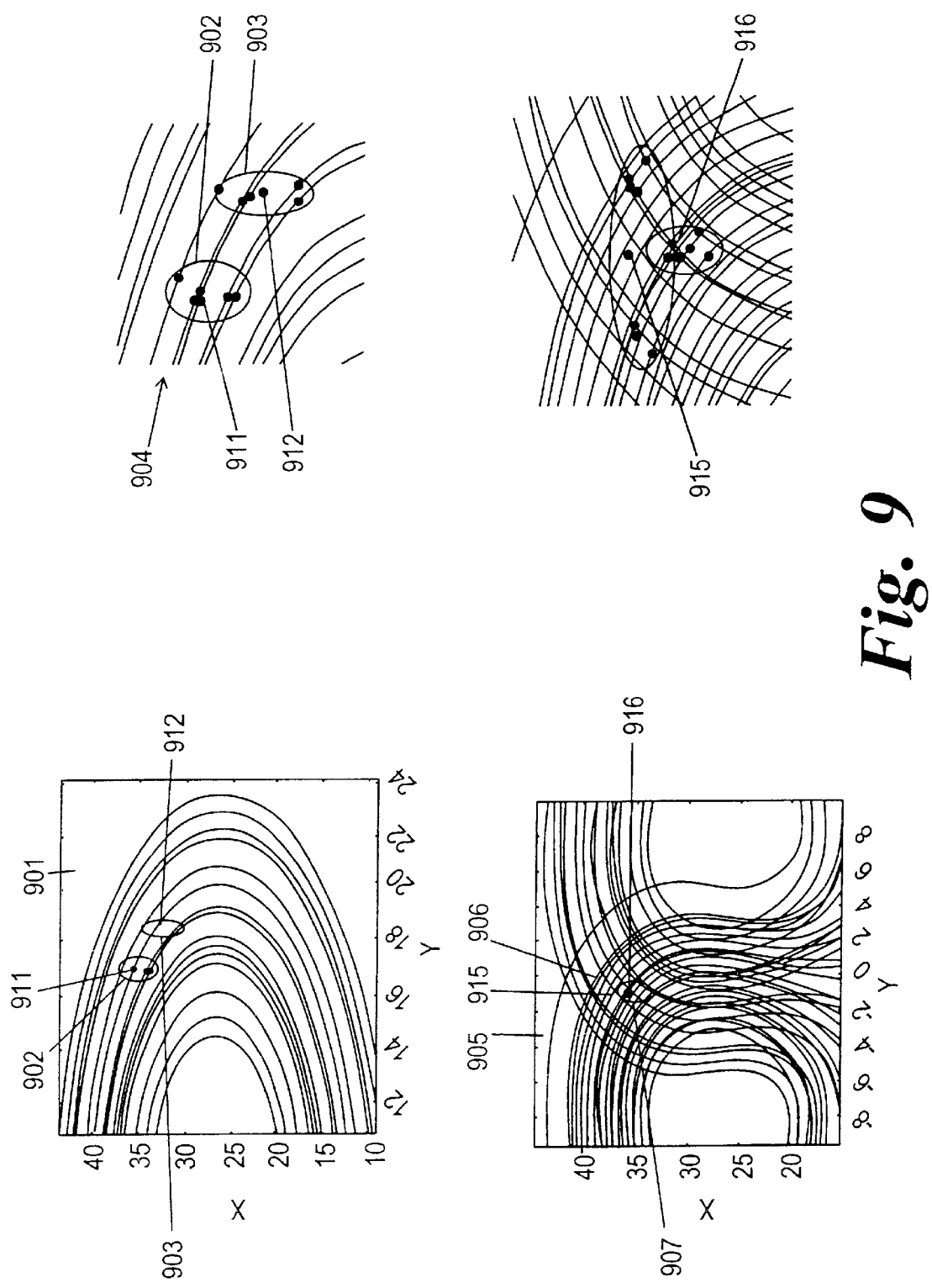
FIG. 9 shows part of the structure of a known attractor, the Lorenz attractor.

The quality of the prediction depends on the data and also on the position of the last data value in the m-dimensional space. FIG. 9 shows parts of the structure of a known attractor, the Lorenz attractor. Graph 901 shows a region on the attractor which affords a good prediction. The current observation of the series is represented as point 911 and the nearest neighbours to this point are those points within the region labelled 902. The predicted value of the series is shown as 912 and the nearest neighbours to this point are within region 903. Graph 904 shows a region from graph 901 in greater detail. Because the actual observation 911 and the predicted value 912 are positioned along a similar trajectory within the attractor the prediction is likely to be successful. However, graph 905 shows a region in the Lorenz attractor where trajectories cross and change direction. In this region prediction is difficult. The actual observation 916 and the predicted value 915 do not lie along the same trajectory.

Figure 10:
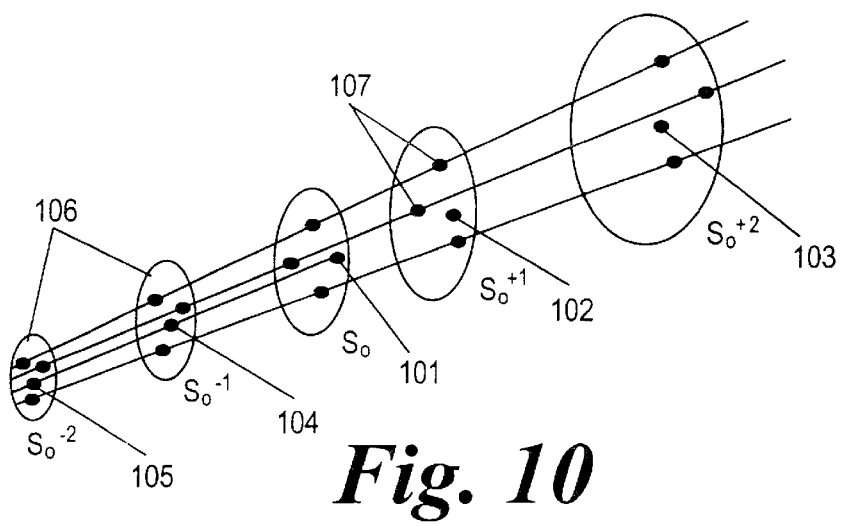
FIG. 10 is a schematic diagram of a series of product data.

In order to improve the prediction for situations where trajectories within the attractor are changing direction the following step is incorporated into the prediction method. FIG. 10 is a schematic diagram of a number of measurements in a series of product data. The rings 106 represent neighbourhoods around measurements in the series. Point 101 represents the current observation in the series. Point 104 represents the previous observation in the series and point 105 represents the observation in the series prior to the previous observation. Similarly, points 102 and 103 represent the predicted values for the next and next but one values in the series respectively. Within each ring 106 a number of nearest neighbours are represented 107. Given the current observation the prediction method can be used to predict a future value 102 as described above. In order to make this prediction the nearest neighbours for the current observation 101 are "projected forward" one measurement step and this assumes that the trajectory directions for those nearest neighbours has not changed direction substantially. In order to check whether the trajectory direction(s) have changed substantially the previous two measurement steps are checked. The nearest neighbours of the current observation 101 are traced backwards for a measurement step and this gives a set of "second corresponding vectors". If these second corresponding vectors lie within the nearest neighbourhood 106 for measurement 104 (in this example, measurement 104 is the "particular vector" of Claim 14) then this is an indication that the trajectory has not changed direction substantially. For second corresponding vectors that do not lie within the nearest neighbourhood 106 for measurement 104, their corresponding nearest neighbours from step 101 are not used when determining the predicted value 102 or 103. Similarly, the nearest neighbours of the current observation 101 can be traced backwards for two measurement steps or a greater number of measurements steps.

The prediction results output from the computer are also provided with confidence limits which given an indication of how accurate the prediction is. The confidence limits are determined using information about the input data and also the prediction method as is know to a skilled person in the art.

It is also possible to improve the prediction results by "cleaning up" the input data before it is provided to the prediction process. For example, extreme outlying values are removed from the data in cases where an impedance level is measured as 0 and in similar situations.

Matlab Toolbox

Figure 12:
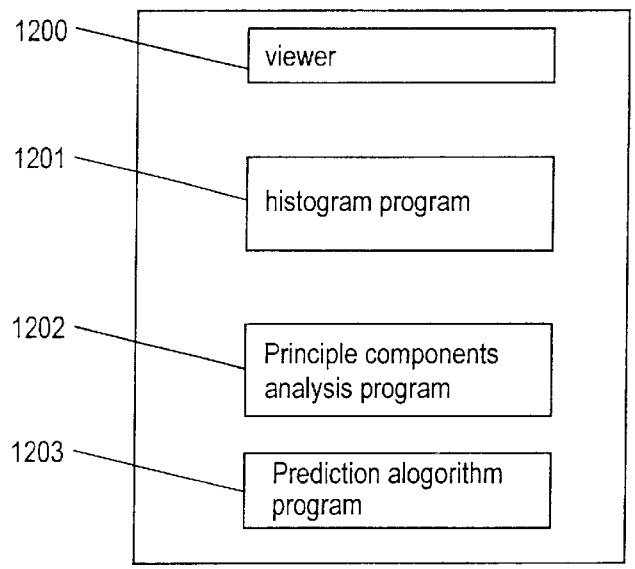
FIG. 12 shows an example of a suite of software programs that form part of the computer system.

The computer system also comprises a suite of software programs as shown in FIG. 12 written using the Matlab system. However any other suitable programming language can be used to form these programs. The programs include a viewer 1200, a histogram program 1201, a principal components analysis program 1202 and a prediction algorithm program 1203.

Viewer

Figure 13:
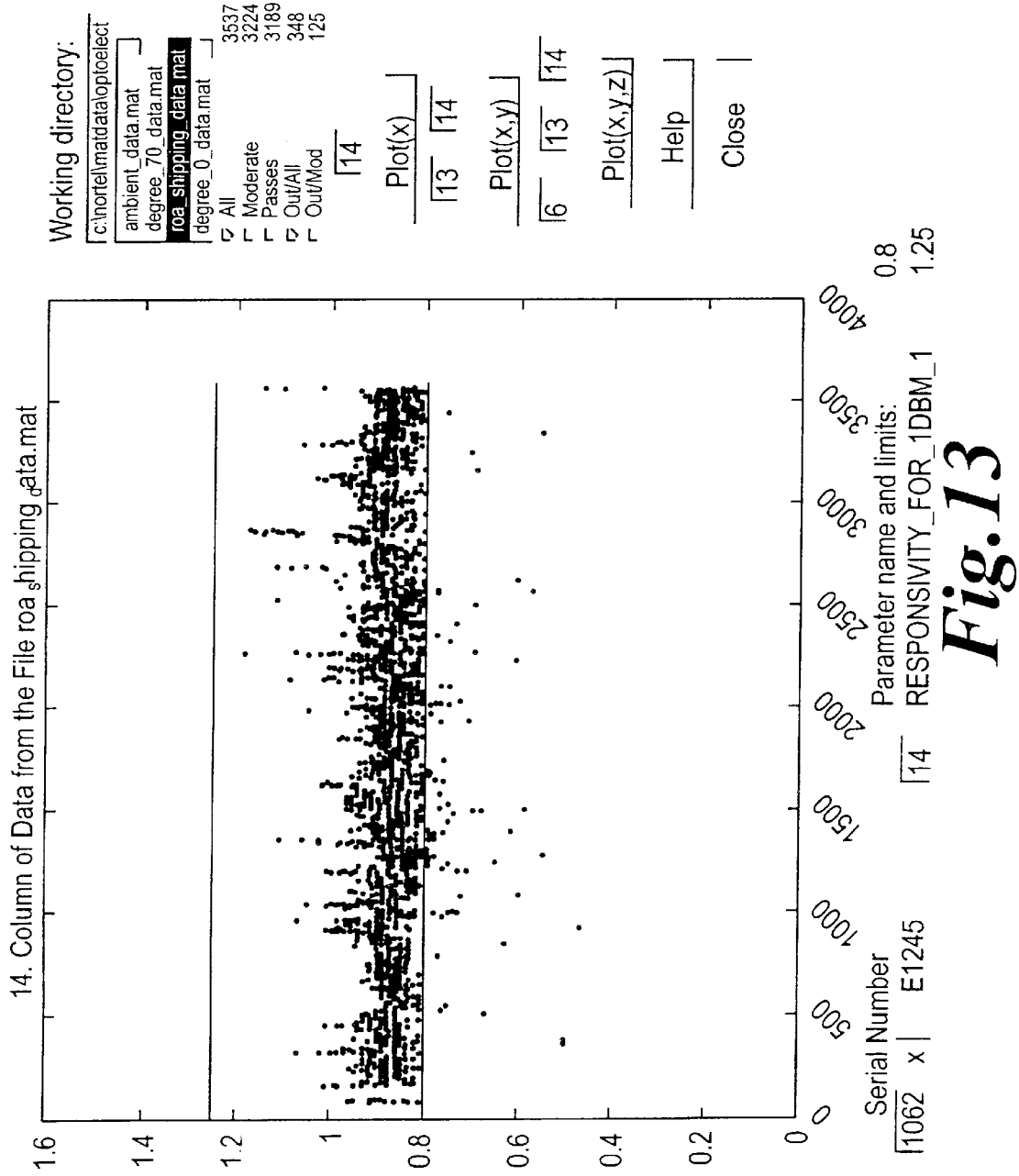
FIG. 13 is an example of a display from the view program.

The viewer program allows the user to open directories, view matlab database files, open files and select matrices for displaying. One, two and three dimensional plots can be drawn and it is possible to "zoom in" on areas of these plots and to rotate the three dimensional plots. The name of the parameter being displayed is shown on a display screen together with the upper and lower tolerance limits, set by the factory for that particular parameter. A help facility is provided for the user which presents basic information about the program and a close button allows the program to be exited. FIG. 13 is an example of a user interface display produced by this program. In this example, parameter 14 from the data file "roa shipping data" is presented. These values are shown on the y axis and the x axis represents the position in the data sequence. The horizontal lines on the graph show the tolerance limits set by the factory for this parameter. In this example, all data points available for this series are plotted. This includes data for products that have given test readings that "failed" on another parameter; most of these points fall below the lower tolerance limit. Also included are data points from products which gave test readings which were associated with some sort of physical defect or assembly malfunction e.g. 0 impedance—short circuit. These data points are extrinsic to the process that it is aimed to model. The majority of the data points represent products for which the parameter value "passed".

Histogram Program

Figure 14:
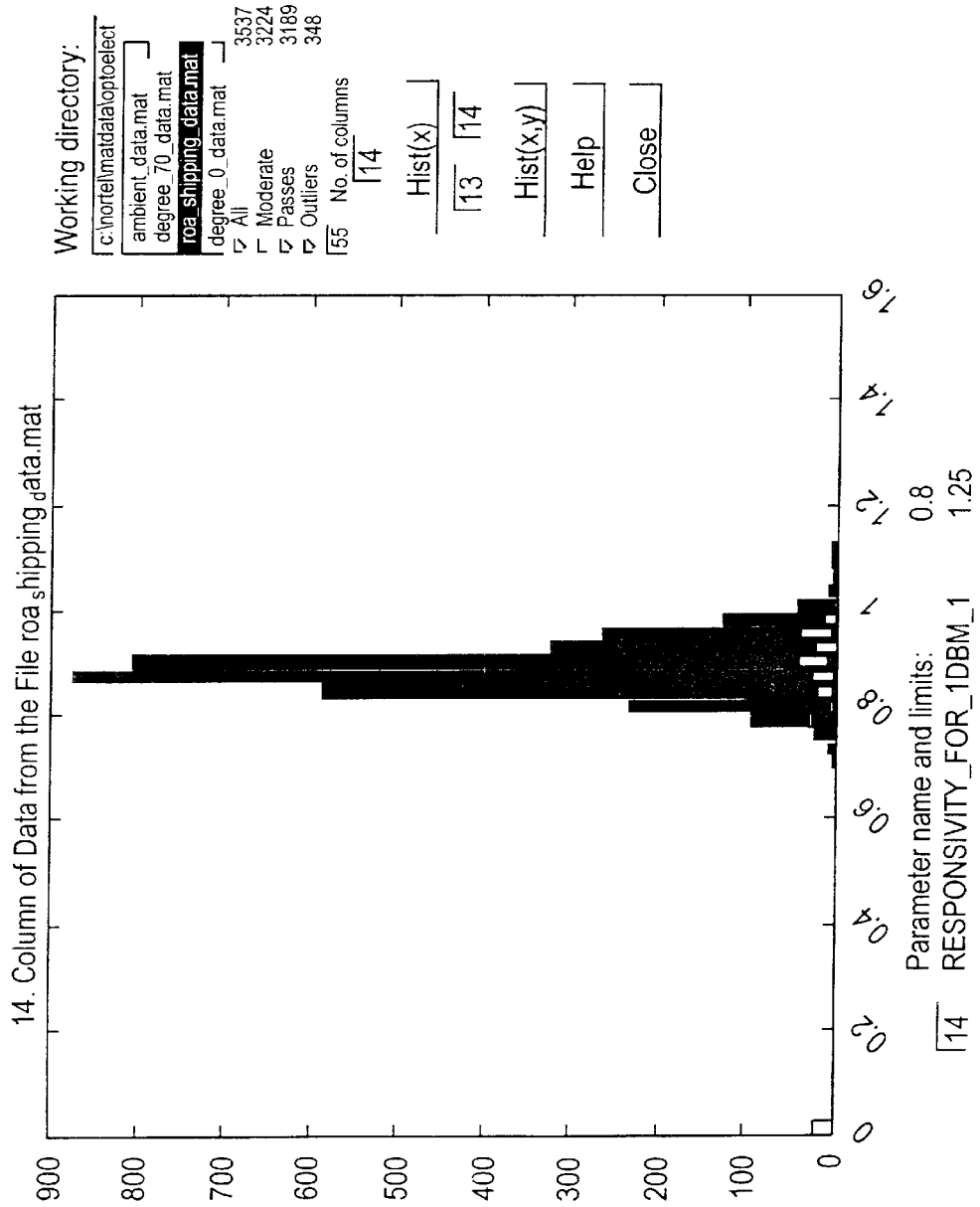
FIG. 14 is an example of a display from the histogram program.

The functions that the histogram program provides are:
opening directories
viewing matlab database files
opening files
selecting matrices for displaying
plotting one or two dimensional histograms
the ability to select the optimal number of histogram columns
the ability to "zoom" into a region of a histogram, or to rotate a 2 dimensional histogram
display of tolerance limits, title
provision of help facility and close facility FIG. 14 shows an example of a display from the histogram program. This is for the same data set as shown in FIG. 13.

Principal Components Analysis Program

Figure 15:
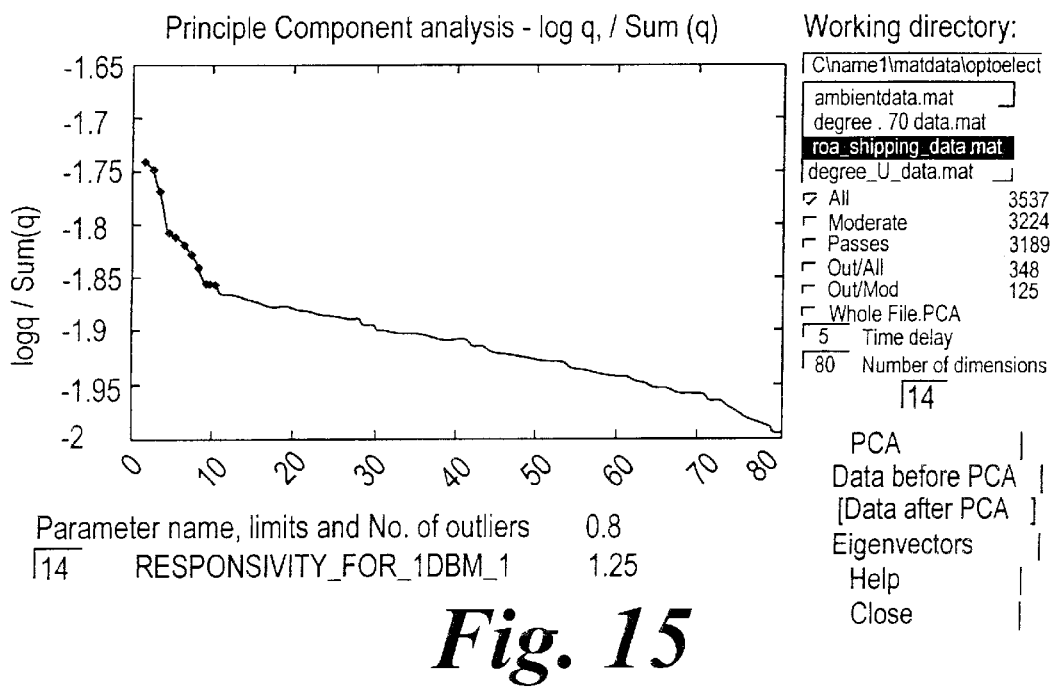
FIG. 15 is an example of a display from the principal components analysis program.

The functions that the principal components analysis program provides include:
opening directories
viewing matlab database files
opening files
selecting matrices for displaying
carrying out a principal components analysis as described herein, for data in a single file, or a selection of data from a single file carrying out a principal components analysis as described herein, for a single parameter provision of a zooming 1 dimensional plot of the eigenvalues provision of 3 dimensional plots of the data before or after transformation using the eigenvectors and ability to rotate these plots display of parameter name, tolerance limits, title help facility and close facility FIG. 15 shows the results of a principal component analysis for the data set of FIGS. 13 and 14. In this example, the time delay was 5. The x axis shows the displacement number and the y axis shows an indication of the contribution that each delay vector makes to the results. In this example, the first 8 or so delay vectors are shown to have a relatively large effect on the results. FIG. 16a shows an example of the first three columns of the matrix 22 plotted for the same data set as for FIGS. 13, 14 and 15. In this example, the time delay was 5. FIG. 16b shows a similar plot but for the data of FIG. 16a after it has been transformed during the principal component analysis using the eigenvectors. This unexpectedly reveals an attractor structure given that the data set (shown in FIG. 13) is irregular and contains outlying values and discontinuities.

Figure 17:
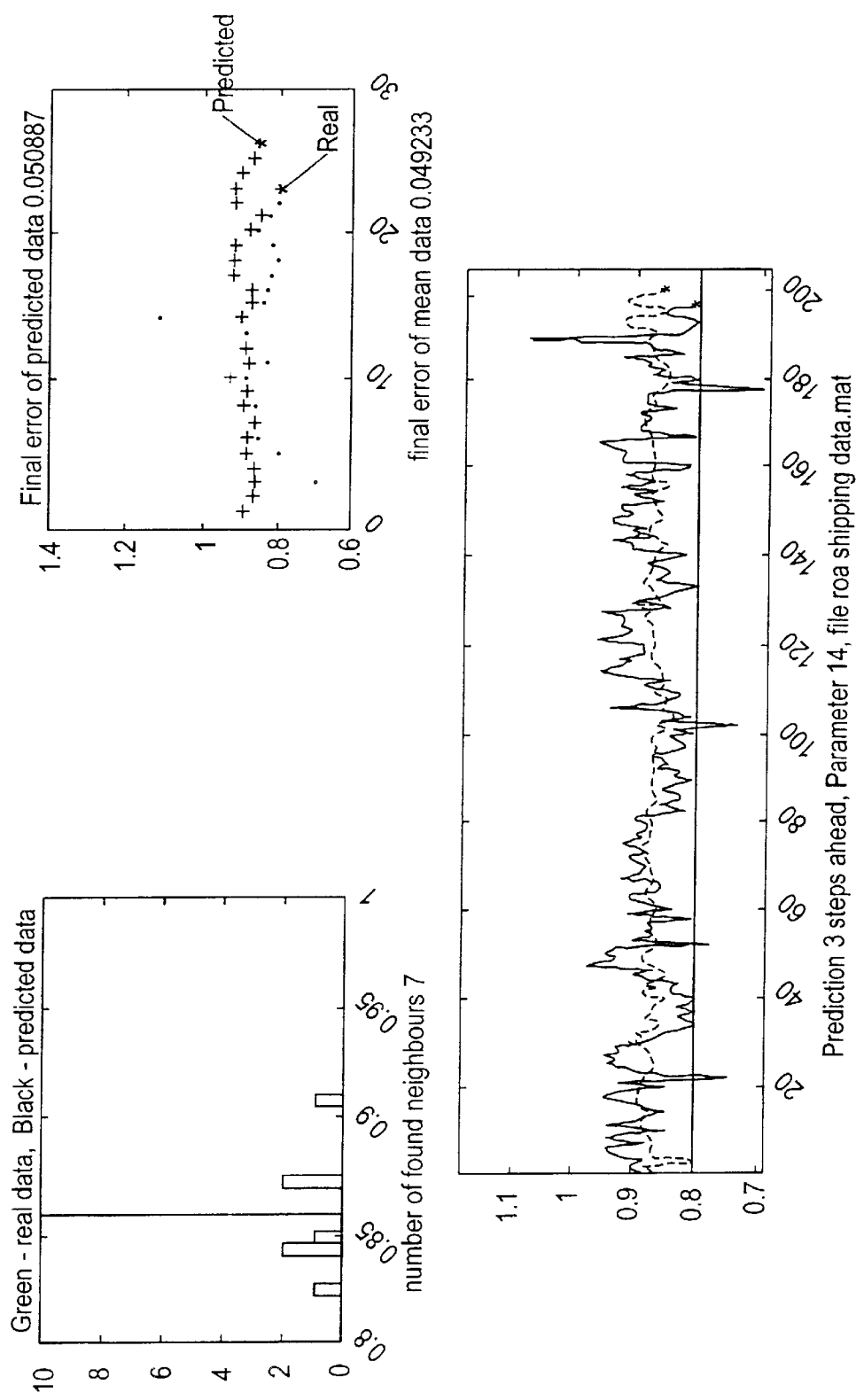
FIG. 17 is an example of a display from the prediction algorithm program.

FIG. 17 shows an example of displays from the prediction program which implements the prediction method described herein. The data set is the same as for FIGS. 13 to 16. The lower graph in FIG. 17 shows a graph of predicted (dotted) and real (solid) data with the horizontal line indicating the lower tolerance limit for this parameter (set by the factory). The upper tolerance limit was set at 1.2 and is not shown. The current real and predicted values are shown by stars at the end of the respective lines. (The star at the end of the dotted line is predicted from the star at the end of the solid line.) In this case the prediction length was three steps ahead.

The upper right hand plot in FIG. 17 shows a graph of the predicted (indicated by "+" symbols) and real (indicated by dot symbols) values for the last 25 predictions. The two stars show the current predicted and real values.

The upper left hand plot in FIG. 17 shows a histogram of the data used to predict the predicted value. In this example 7 nearest neighbours were found and the "predicted values" for these neighbours (found by following their trajectory three time steps ahead) are shown in the histogram. The vertical line depicts the predicted (averaged) value of the "predicted" neighbours and in this example the vertical line also depicts the real value which corresponds to the predicted value. The real value is obtained by waiting until this value is received from the factory test devices.

In the example shown in FIG. 17 the prediction is made for a time delay of 5 and an embedding dimension of 7. The prediction base is 2000 tests and the program predicts 3 steps ahead for the next 200 tests.

Figure 18A:
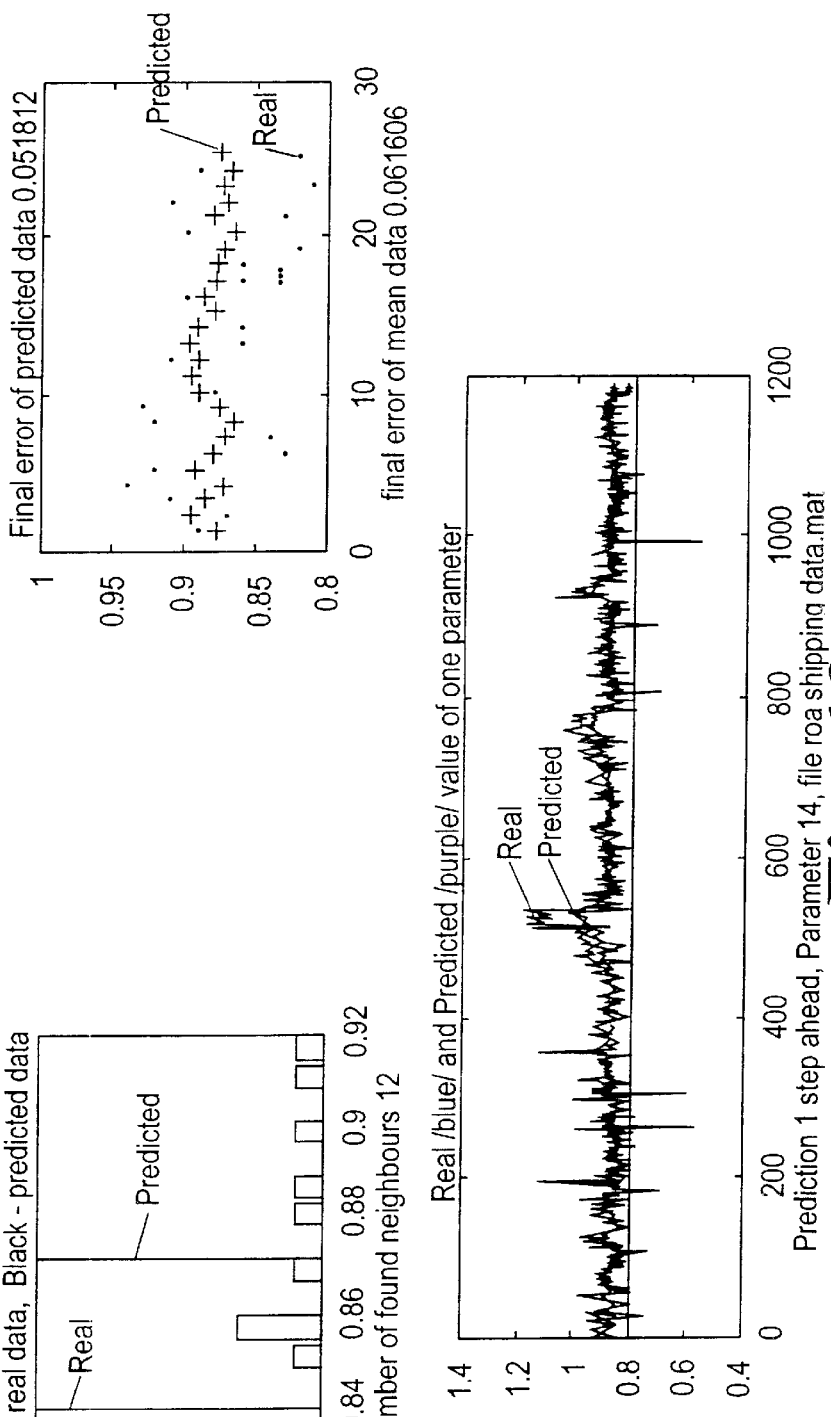
FIG. 18 is another example of a display from the prediction algorithm program.
Figure 18B:
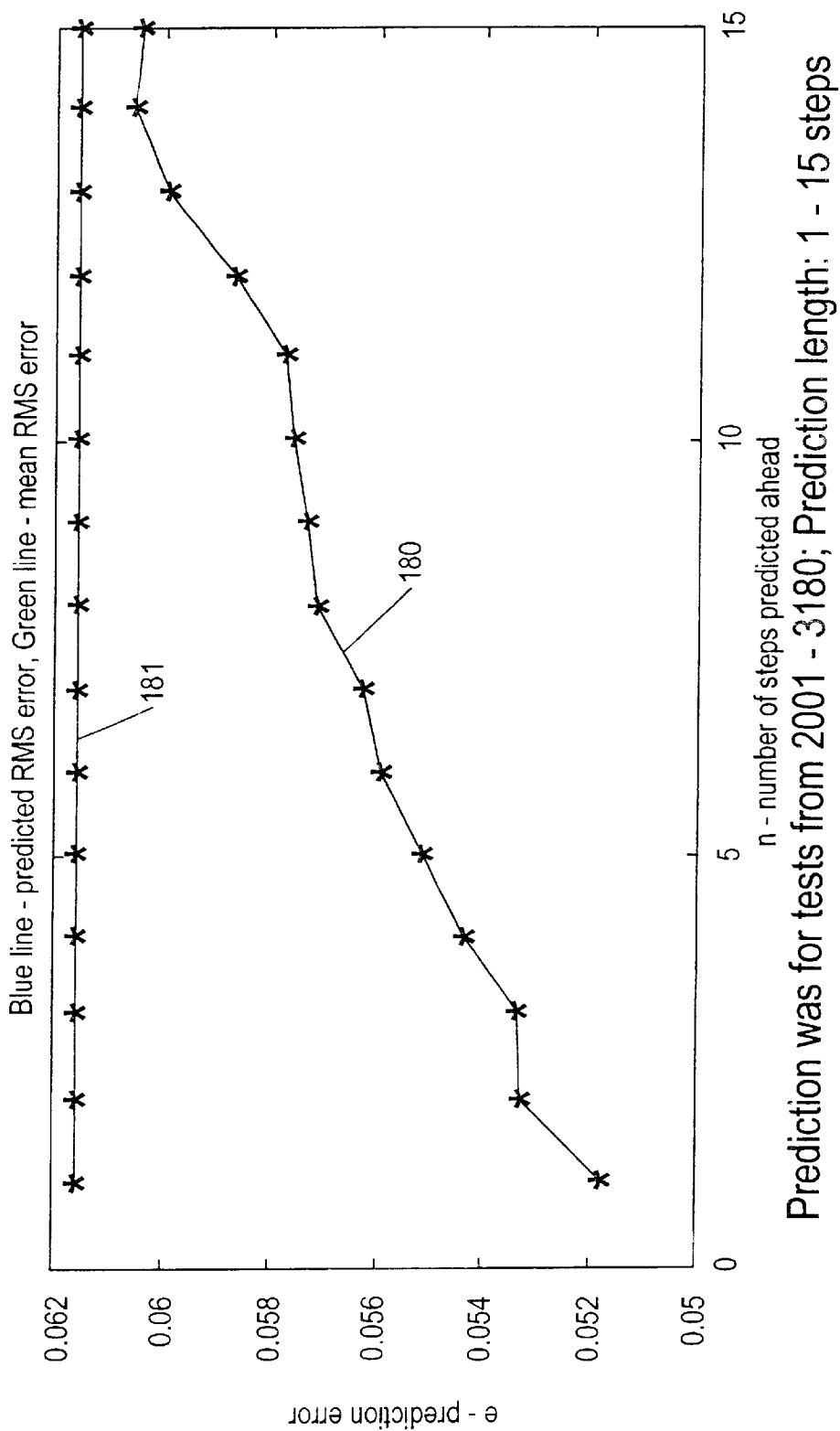

FIG. 18 is similar to FIG. 17 and shows data from the same file and for the same parameter. However, this time more prediction tests are shown and the prediction step size is 1. The lower plot in FIG. 18 shows the prediction error against the number of steps predicted ahead. This shows how the prediction error (line 180) increases as the number of steps predicted ahead increases and indicates that for 15 prediction steps ahead, the prediction error is only around 0.06. Line 180 shows the root mean square error of the predictions produced by the prediction algorithm described herein. Line 181 shows the root mean square error when the prediction is that the next value in the series will be the mean of the values so far. This line is shown for comparison purposes only.

Figure 19A:
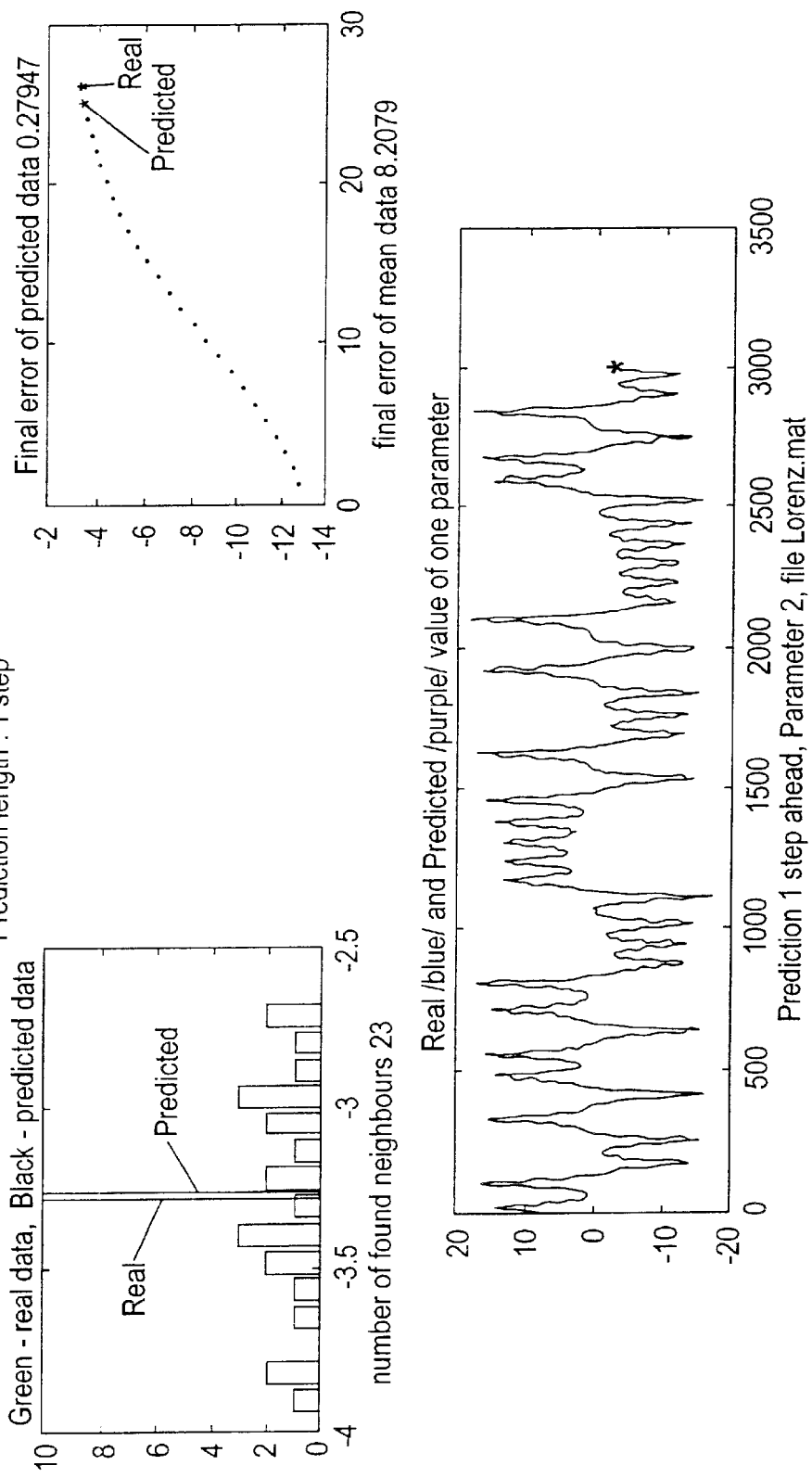
FIG. 19 is an example of a display from the prediction algorithm program for data describing the known Lorenz attractor.
Figure 19B:
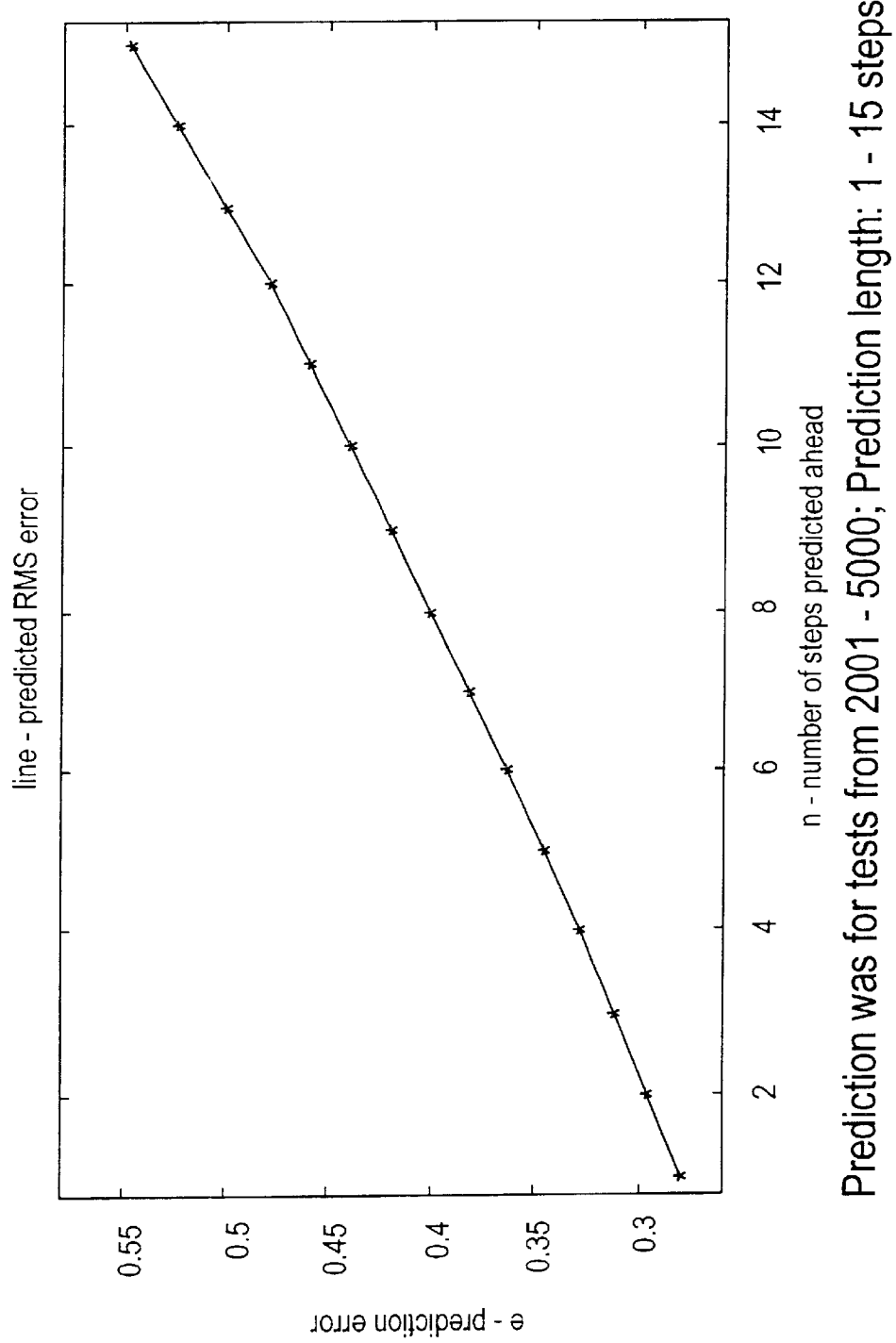

The prediction algorithm and the method for determining the attractor structure have been extensively tested using known data to check for errors and artefacts in the methods. No such artefacts have been found. For example, FIG. 19 corresponds to FIGS. 17 and 18 but in this case, data from the known Lorenz attractor were input to the computer system. FIG. 19 shows how the predicted values from the prediction algorithm and the actual data correspond almost exactly.

Choosing the Time Delay

The value of the time delay that is used affects the results of the prediction process and the structure of the attractor that is determined from the product data. This means that the method used for determining the time delay is very important. The value of the time delay is chosen such that it fits the following conditions:

The time delay $\tau$ (which has also been referred to using the symbol "v" above) must be a multiple of the sampling period because data is only available at these times. (In the situation that the time interval between the product data measurements is irregular, the time delay is a certain number of steps in the series, regardless of the time intervals between the product data measurements.)

If the time delay is too small, then the co-ordinates $x_i$ and $x_{i+\tau}$ will be so close to each other in numerical value that we cannot distinguish them from each other. They will not be independent enough because they are not two independent co-ordinates.

If the time delay is too large the $x_i$ and $x_{i+\tau}$ are completely independent of each other in a statistical sense, and the projection of an orbit on the attractor is onto these two totally unrelated directions. The independence of co-ordinates is caused by an intrinsic instability of chaotic systems which is growing with time.

The following three methods are used in order to determine the time delay:

1. optimal filling of the state space;
2. autocorrelation function; and
3. average mutual information.

A sensible compromise value for the time delay is chosen based on the results of one or more of these three methods. These methods are now described in detail:

Optimal Filling of the State Space

Figure 3A:
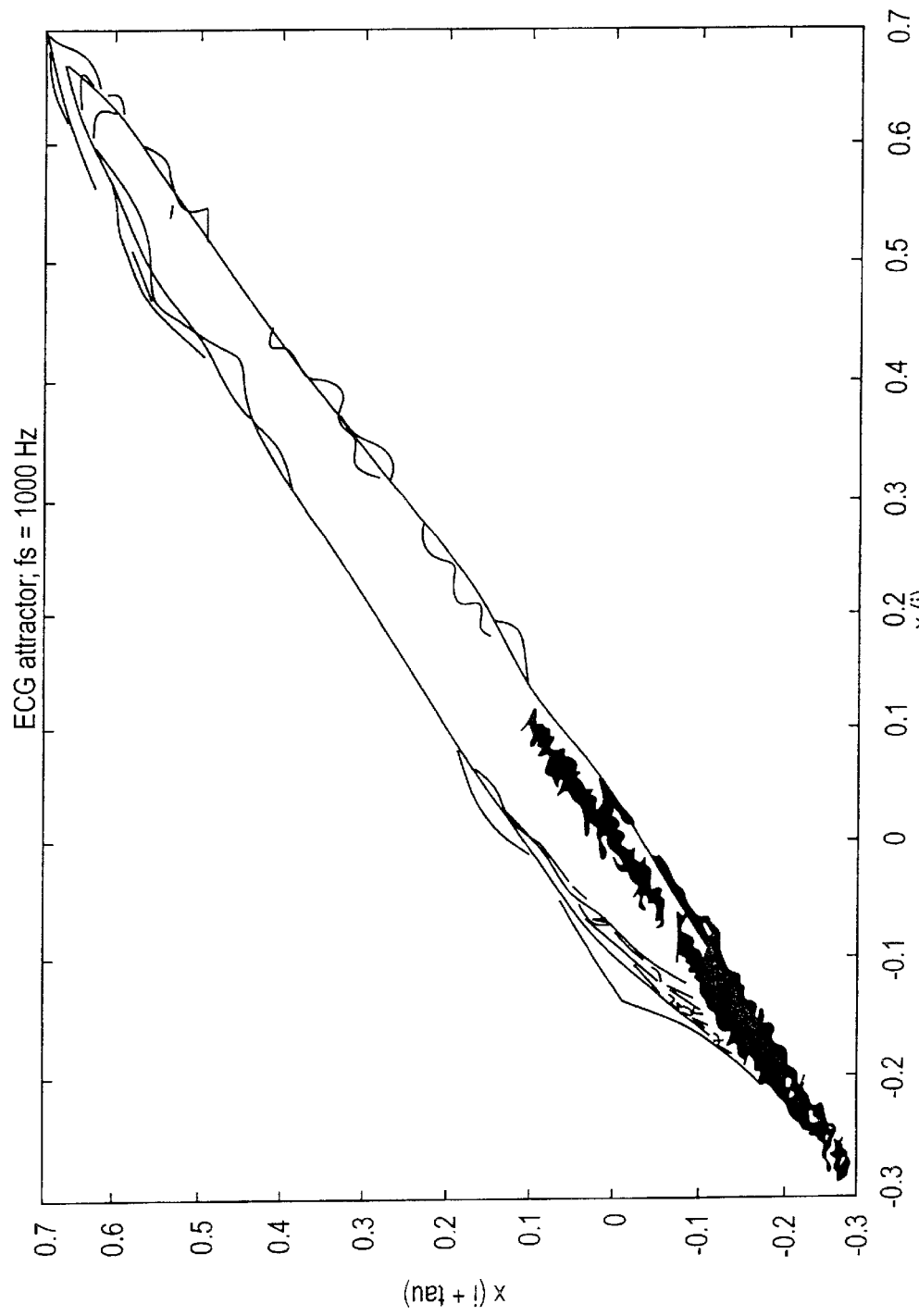
FIG. 3a shows reconstruction of an electrocardiogram (ECG) attractor in 2 dimensional space where the time delay is 2 ms and the sampling interval is 1 ms.
Figure 3B:
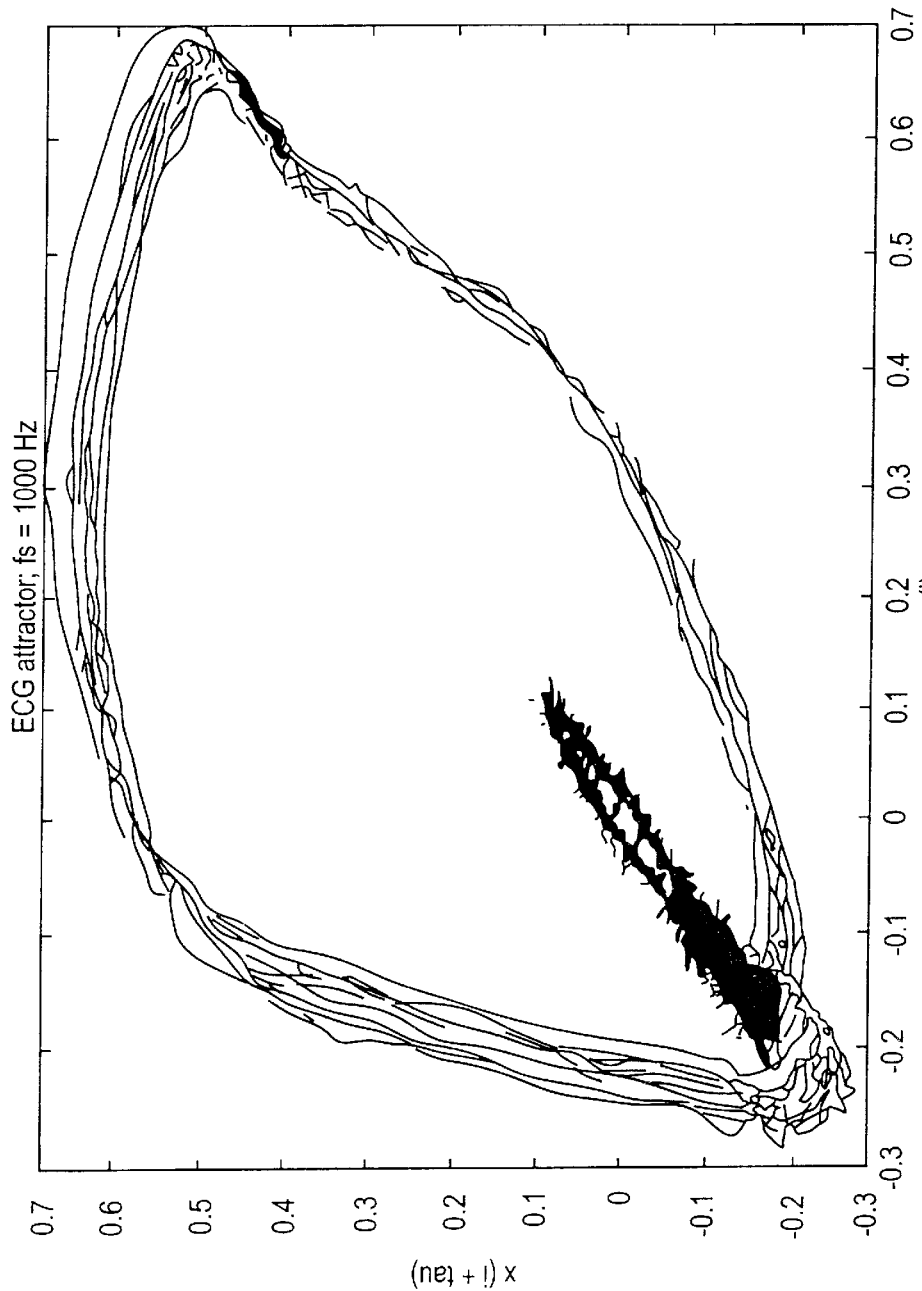
FIG. 3b shows reconstruction of an electrocardiogram (ECG) attractor in 2 dimensional space where the time delay is 8 and the sampling interval is 1 ms.
Figure 3C:
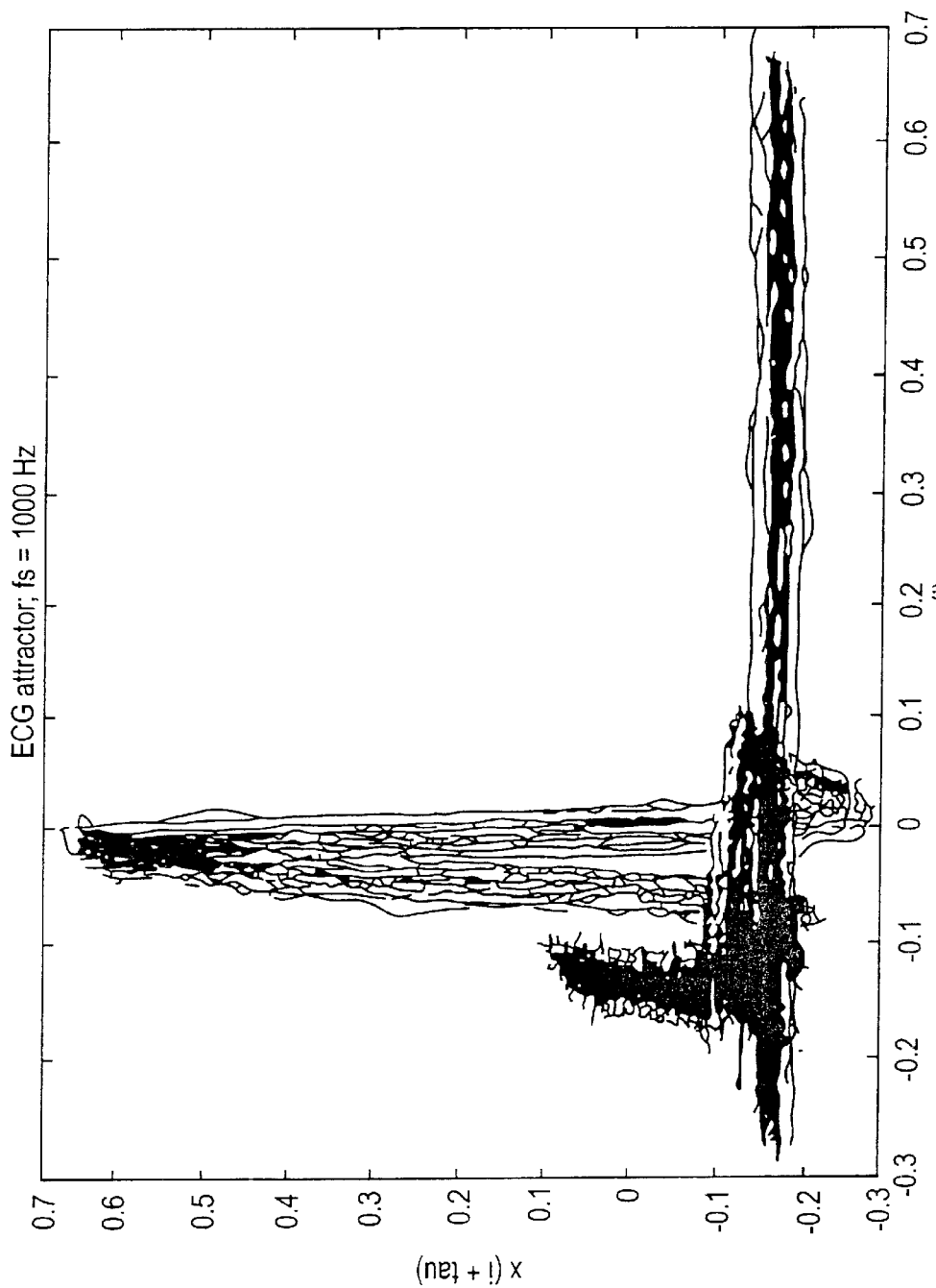
FIG. 3c shows reconstruction of an electrocardiogram (ECG) attractor in 2 dimensional space where the time delay is 220 and the sampling interval is 1 ms.

In this method, phase portraits are plotted for different values of the time delay and the situation in which the phase portrait best fills the state space is chosen. For example, FIGS. 3a, 3b and 3c show phase portraits for an ECG (electrocardiogram) signal. In FIG. 3a the time delay is 2; in FIG. 3b the time delay is 8 and in FIG. 3c the time delay is 220. When the time delay is 2 (FIG. 3a) the phase portrait is too contracted around the diagonal. When the time delay is 220 then geometrical deformation of the phase portrait occurs (FIG. 3c). The time delay is therefore chosen to be 8 because in FIG. 3b the phase portrait fills the state space relatively well, compared to FIGS. 3a and 3c.

Autocorrelation Function

Figure 20:
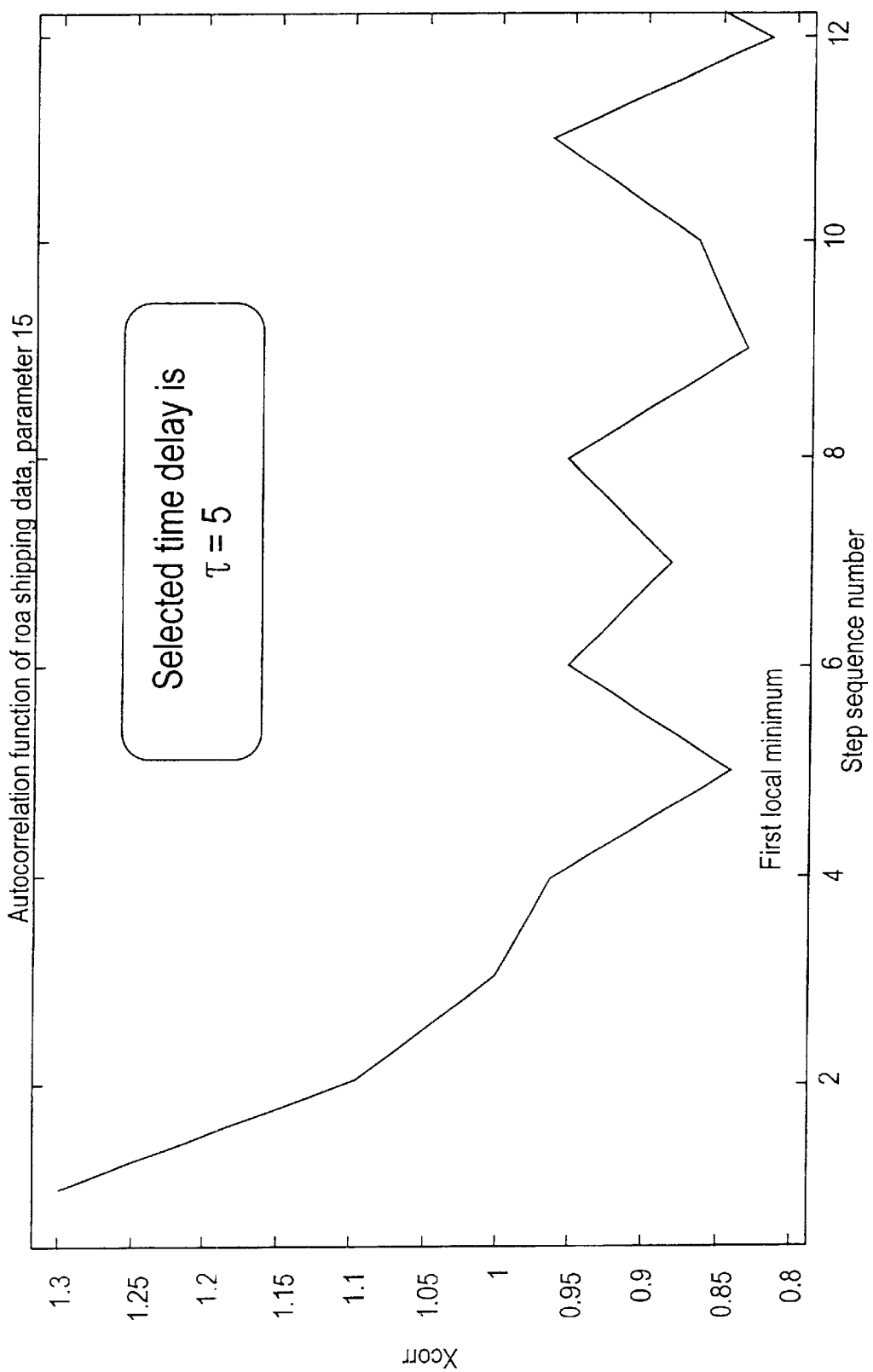
FIG. 20 shows a graph of autocorrelation function against step sequence number (or time delay) for the data set "roa shipping data, parameter 15".

This method involves plotting a graph of autocorrelation against step sequence number (or time delay). FIG. 20 shows an example of this type of graph for the data series "roa shipping data, parameter 15". In this example, the first local minimum of this graph occurs at around step sequence number 5 (or time delay=5). It is not essential to choose the first local minimum of this graph. Other local minima points can also be chosen.

An example of an autocorrelation function $C_L(\tau)$ that is used to plot the autocorrelation graph is given below:

$$C_L(\tau) = \frac{\frac{1}{N}\sum_{m=1}^{N}[s(m+\tau)-\bar{s}][s(m)-\bar{s}]}{\frac{1}{N}\sum_{m=1}^{N}[s(m)-\bar{s}]^2}$$

$$\bar{s} = \frac{1}{N}\sum_{m=1}^{N} s(m).$$

Average Mutual Information

The average mutual information is a method, which provides a notion of general independence between two time series measurements $a_i$ and $b_j$ drawn from sets A and B of all possible measurements. The "mutual information" between measurement $a_i$ drawn from a set A=$\{a_i\}$ and measurement bj drawn from a set B=$\{b_j\}$ is the amount learned by the measurement of $a_i$ about the measurement of $b_j$. In bits it is:

$$\log_2[(P_{AB}(a_i,b_j))/(P_A(a_i) \cdot P_B(b_j))],$$

where $P_{AB}(a,b)$ is the joint probability density for measurements A and B resulting in values a and b. $P_A(a)$ and $P_B(b)$ are the individual probability densities for the measurements of A and of B.

If the measurement of a value from A resulting in $a_i$ is completely independent of the measurement of a value from B resulting in $b_j$, then $P_{AB}(a,b)$ factorises: $P_{AB}(a,b)=P_A(a) \cdot P_B(b)$ and the amount of information between the measurements, the mutual information, is zero. The average over all measurements is called the "average mutual information" between A measurements and B measurements and it is considered as:

$$I_{AB} = \Sigma P_{AB}(a_i,b_j)\log_2[(P_{AB}(a_i,b_j))/(P_A(a_i) \cdot P_B(b_j))]$$

$$a_i b_j$$

This technique is strictly a set theoretic idea which connects two sets of measurements with each other and establishes a criterion for their mutual dependence based on the notion of information connection between them.

We want to find the connection between the set of data $x_i$, and the set of delay data $x_{i+\tau}$. So we take as the set of measurements A the values of $x_i$ and for the B measurements the values of $x_{i+\tau}$. Then the average mutual information is:

$$I(\tau) = \Sigma P(x_i,x_{i+\tau})\log_2[(P(x_i,x_{i+\tau}))/(P(x_i) \cdot P(x_{i+\tau}))]$$

$$x_i, x_{i+\tau}$$

In order to evaluate $I(\tau)$ from data the following method is used. In a deterministic system we evaluate the amount of information in each measurements by constructing a histogram of the variations of the $a_i$ and $b_j$ and by computing the entropy of the system:

$$H(A) = -\sum_{i=1}^{N} P(a_i) \cdot \log(P(a_i))$$

$$H(B) = -\sum_{j=1}^{M} P(b_j) \cdot \log(P(b_j))$$

We construct a 2-dimensional histogram for the joint probability density $P_{AB}$ and we then compute the joint entropy:

$$H(A \& B) = -\sum_{i=1}^{N}\sum_{j=1}^{M} P(a_i,b_j) \cdot \log(P(a_i,b_j))$$

The average mutual information is:

$$I = H(A) + H(B) - H(A \& B)$$

This means that the sum of joint information $H(A\&B)$ is lower than the sum $H(A)+H(B)$. The difference is the average mutual information, i.e. the information we can learn from the set A about the set B.

Figure 5:
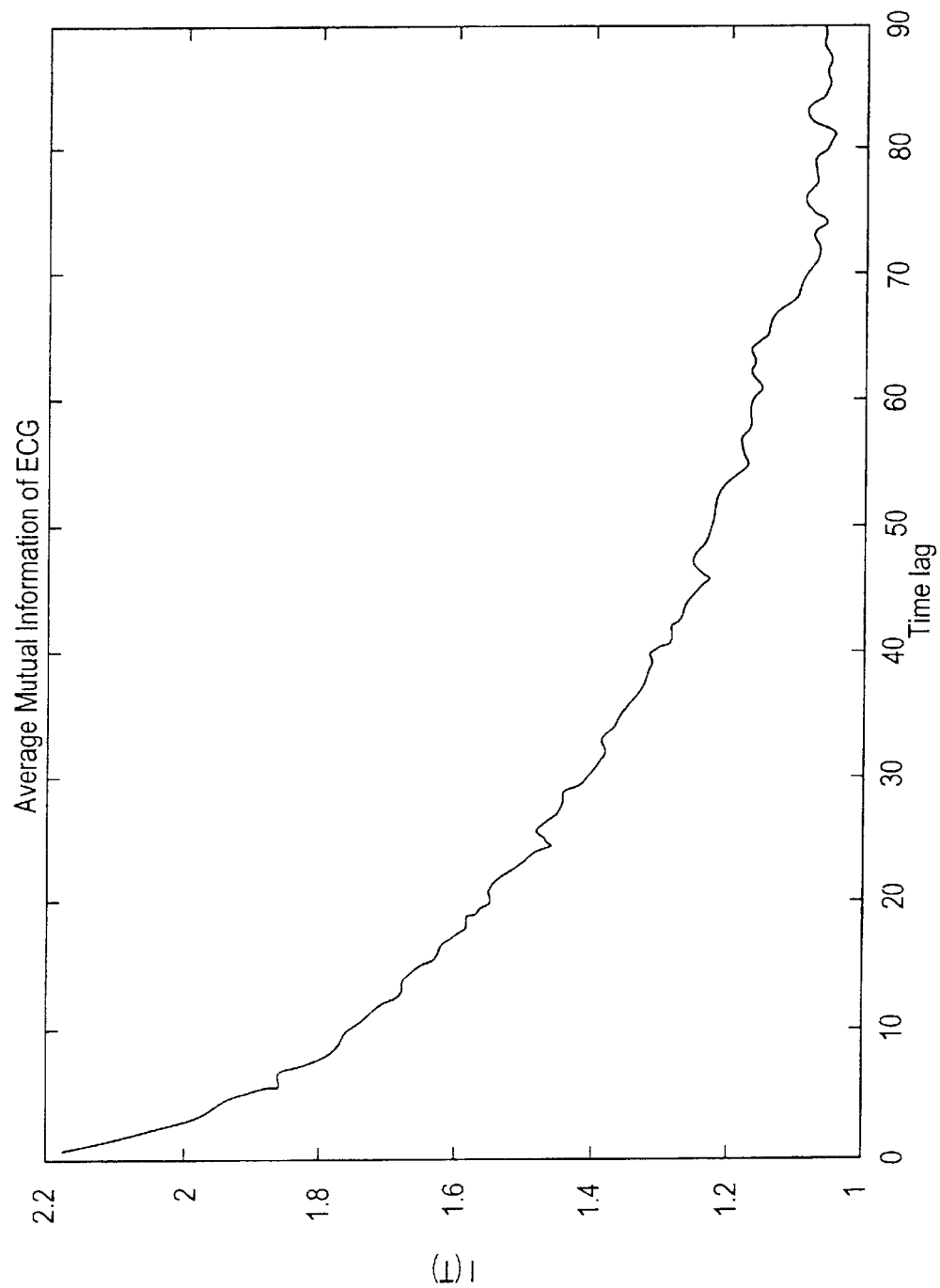
FIG. 5 shows a graph of average mutual information against time lag (or time delay) for electrocardiogram data.

A plot of the average mutual information $I(\tau)$ is made as shown in FIG. 5. The time delay is chosen as the first local minimum of $I(\tau)$. For example, in FIG. 5 the first local minimum occurs at about $\tau=20$. However, it is not essential to choose the fist local minimum, other local minima can be taken. Another option is to choose the value of $\tau$ where $I(\tau)=I(0)/5$.

Choosing the Embedding Dimension

The value of the embedding dimension that is used affects the results of the prediction process and the structure of the attractor that is determined from the product data. This means that it is important to determine the embedding dimension well. The embedding dimension is the lowest dimension which unfolds the attractor fully and eliminates overlapping trajectories. Since computational costs rise exponentially, we should used the minimum possible dimension. Also background noise could be misinterpreted as a low-dimensional process if the embedding dimension is too large.

The following four methods are used to determine the embedding dimension:

1. principal component analysis
2. saturation of systems invariants
3. false nearest neighbours
4. true vector fields The embedding dimension is chosen based on the results of one or all of these methods. These four methods are described below:

Principal Component Analysis

This method is also known as singular value analysis, Karhunen-Loeve decomposition and principal value decomposition. It is a general algorithm for decomposing multi-dimensional data into linearly independent co-ordinates. Mathematically the algorithm involves decomposing a rectangular m-by-n matrix, X, into the following form:

$$X = S\Sigma C^T$$

where T denotes transpose. S and C are column orthogonal matrices, the columns of which are called the "singular values", $\sigma_i$, of X, where $\sigma_1 \geq \sigma_2 \geq \sigma_3 \geq \sigma_4 \geq \ldots \geq \sigma_n$. Consider the delay vector as $$\{x_1^m\} = \{(x_1, x_{i+\tau}, x_{i+2\tau}, \ldots, x_{i+(m-1)\tau})\} \in R^m$$

and the delay matrix X $R^{n \times m}$ as a normalised sequence of all delay vectors, $$X = \frac{1}{\sqrt{N}} \begin{pmatrix} x_1^m \\ x_2^m \\ x_3^m \\ \vdots \\ x_N^m \end{pmatrix},$$

where N is the number of measured samples and m is the embedding dimension. We project the attractor reconstructed by the Takens method of delays to a new state space, where the projection of the data is more optimal. (It is known from information theory that this method produces an optimal compression of information.) The first step is the estimation of the covariance matrix $E \; R^{m \times m}$ by $E = X^T X$. The next step is the diagonalisation of the covariance matrix E. Since E is a real symmetric matrix it can be written as the product $E = S\Sigma^2 S^T$, where S is mxm orthonormal and $\Sigma^2$ is mxm diagonal. The columns of S are the singular vectors of X, which form the orthonormal basis for the embedding space. The components of the diagonal matrix $\Sigma^2$ are the squares of the singular values of X, $(\sigma_i)^2$. We can plot a graph of the singular values against their index n, which is called the "singular spectrum". The final reconstructed attractor in state space is defined as a rotation on delay vectors $$Y^T = X^T S$$

It is known that the singular spectrum can be divided into a deterministic part and a noise background, where the deterministic singular values are several orders of magnitude bigger than those in the noise background. If a larger embedding dimension than necessary is used, we will see the difference in magnitude of the deterministic singular values and the noise background. This method is used to choose the appropriate embedding dimension m from experimental data.

This technique presents one of the possible approaches to state space reconstruction. It enables us to establish the minimum number of co-ordinates which form an embedding. Furthermore, it optimally projects data in state space and prepares them for further analyses (for example—computing of correlation dimension).

It is known that problems with this method with sensitive dependence on the window length $\tau_w$ exist. A recommended prescription for a choice of window length $\tau_w$ is:

$$m^* \tau = \tau_w \leq \tau = 2\pi/w^*$$

where w* is the band limiting frequency. As there is no obvious lower bound on $\tau_w$, we can take $\tau_w = \tau^0$. It is then simple to find the appropriate dimension as $$m = 2\pi/\tau w^*$$

and to decompose the data in this dimension.

Then we can decompose the data in a very large dimension (60 or 100) and detect differences between big deterministic singular values and low noise background singular values. This criterion gives us the necessary number of co-ordinates for analysed data.

Saturation of System Invariants

System invariants (e.g. correlation dimension) depend on the embedding dimension and this fact can be used in order to determine the embedding dimension. If the attractor is properly unfolded by choosing an embedding dimension m large enough, then any property of the attractor, which depends on distances between points in the state space, should become independent of the value of the dimension, when the necessary embedding dimension is reached. Increasing the dimension further beyond this threshold should not affect the value of these properties. The appropriate embedding dimension can be established as a dimension where the computed invariant has a saturation of its value. Thus by determining the invariants (using known methods) for different dimensions the appropriate embedding dimension can be determined.

False Nearest Neighbours

This method relates to the existence of false crossings of the orbit with itself. These false crossings arise when we project the attractor into a too low dimensional space. The situation happens that two points of the attractor are close to each other only because of false crossing. When we increase the dimension of embedding, the false crossing disappears and the same two points are now in distant places of the attractor. By examining this problem in dimension one, dimension two and then subsequent dimensions, until there are no more false neighbours remaining, one can establish the necessary embedding dimension m. An example of a method for doing his is given in appendix A.

True Vector Fields

It is known that if the dynamics is given by the autonomous rule x→F(x) and F(x) is smooth (differentiable), then the tangents to the evolution of the system are smoothly and uniquely spread throughout the state space. The local vector field has been established by dividing the state space into small volumes and identifying where orbits enter and exit the volumes. This defines the local flow under the assumption that the columns are small enough.

If we analyse the vector field in too small a dimension, the vectors in a field have different directions in the same volume cell and their location is not unique. As we increase the embedding dimension, the frequency of overlap (the different directions of vectors in the volume cells) will fall to zero and the vector field will be unfolded. The dimension, where the different directions of the vectors approach zero, is established as the appropriate embedding dimension m.

A number of advantages are achieved by making use of the invention and these include:

different product designs can be assessed and compared with respect to how easily they are affected by changes in components (e.g. from batch to batch or supplier to supplier)

Measurements taken from products can be used to assess consistency and quality in a practical and effective way. This allows manufacturers to provide product performance and reliability.

Manufacturers are better able to predict the number of products that will be returned.

Poor batch combinations can be identified and described in quantified terms (for example, batch mix and number of units exhibiting change of behaviour).

A range of applications are within the scope of the invention. These include situations in which it is required to predict one or more future values of a series of data or to analyse a series data by determining an attractor structure from that series of data. For example, to manage and control communications systems and other types of communications processes or manufacturing processes; to analyse such processes when they fail, to improve such processes and to monitor them and provide information about the state of the process. If deliberate changes are made to the process these can be confirmed by the computer system.

Methods of determining a level of deterministic behaviour exhibited by a data series are now described together with a method of using such assessments to select suitable prediction algorithms from an algorithm bank. One of the methods of determining a level of deterministic behaviour exhibited by a data series involves determining an attractor structure. In this case, the method of determining an attractor structure as described above may be used. Another method of determining a level of deterministic behaviour described below is referred to as a method of "matrix adjustments". This involves determining a time delay and an embedding dimension. These may be determined as described above. The method of matrix adjustments also involves predicting values of a data series as described above.

Figure 21:
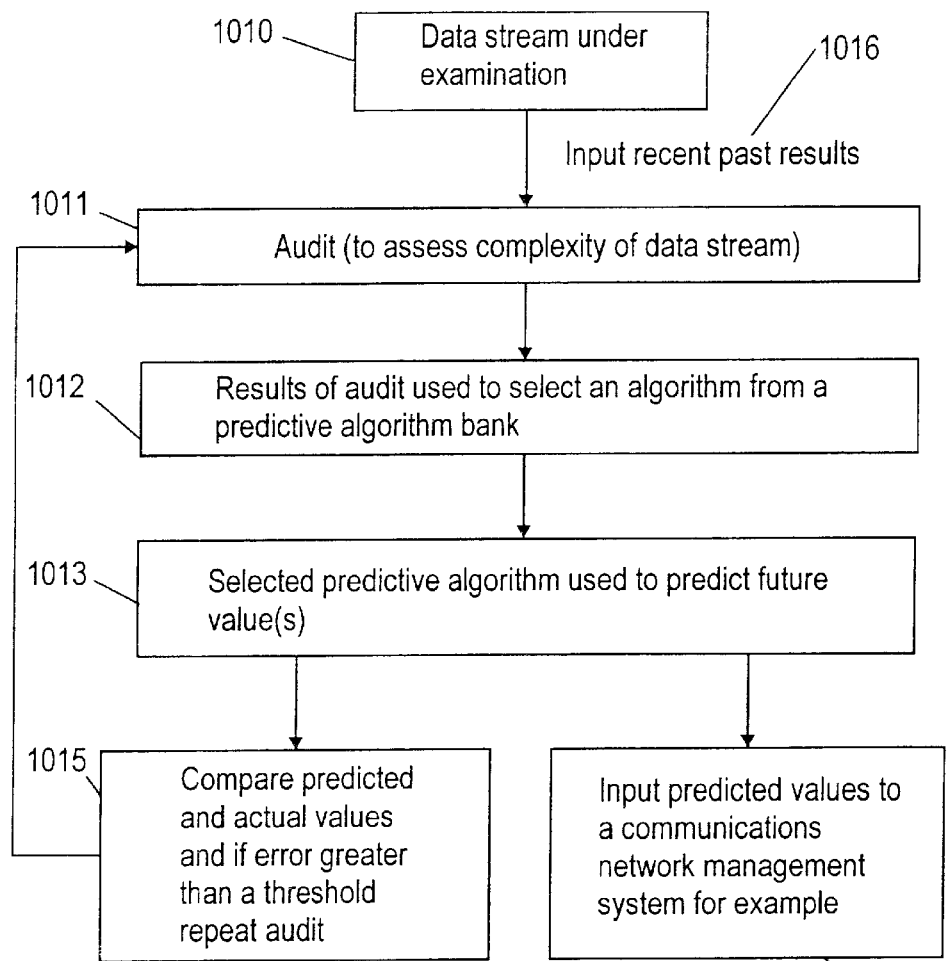
FIG. 21 is a schematic flow diagram of a method of predicting a future value of a series of data.

FIG. 21 is a flow diagram of a method of predicting future values of a series of data. For example, the series of data may comprise product data, such as test measurements taken from optical network products. These can comprise attenuation values, optical power values, resistance values and bandwidth levels for example. The series of data may also comprise telecommunications data such as the number of packets passing through an input at a switch per time interval, such as a micro second. The time intervals between the data items in the series are not necessarily regular.

Recent past data items 1016 from a data stream under examination 1010 are input to a processor which carries out an audit 1011 or analysis of the data stream 1010 based on the recent past data items 1016. This audit 1011 or analysis is arranged to assess the complexity of the data stream 1010.

The results of the audit are then used to select an algorithm from a predictive algorithm bank or library. This step is represented by box 1012 in FIG. 21. The algorithm bank is a store containing a plurality of algorithms suitable for predicting future values of a series of data. Any suitable algorithms may be used and some examples are described below. The algorithms are suitable for predicting future values of different types of series of data, such as stochastic series and deterministic or chaotic series. The results of the audit indicate which member of the algorithm bank is most suitable for the particular data stream 1010 under examination. If two or more algorithms are rated as equally suitable as a result of the audit step 1012 then one of these algorithms is selected (see box 1013 in FIG. 21). For example, the simplest and computationally least expensive algorithm.

The selected algorithm is then used to predict one or more future values of the series of data 1010. Any parameter values that need to be set up for the selected algorithm are also determined using the recent past data items 1016. The predicted values are input 1014 to another system as required. For example, a communications network management system may use predicted values of traffic levels in a communications network in order to determine how best to dynamically configure that communications network.

Continued use of the selected algorithm is then made to predict future values of the series of data 1010 as required. At pre-specified intervals the audit and algorithm selection process 1011, 1012 is repeated. If a different algorithm is selected from the algorithm bank then this is used in place of the previously selected algorithm. The pre-specified intervals may be time intervals or may be intervals specified by an integer number of data points in the series of data. In this way the process "switches" between different algorithms based on the assessment 1011 of which algorithm is most suitable.

It is not essential to repeat the audit and algorithm selection process 1011, 1012 at pre-specified intervals. Instead, the predicted values 1014 may be compared with actual values of the data series, when these become available (see box 1015 in FIG. 21). If the error, or difference between the predicted and actual values exceeds a specified threshold level then the audit and algorithm selection process 1011, 1012 is repeated. This gives the advantage that the audit and algorithm selection process 1011, 1012 are only carried out when required.

Figure 21A:
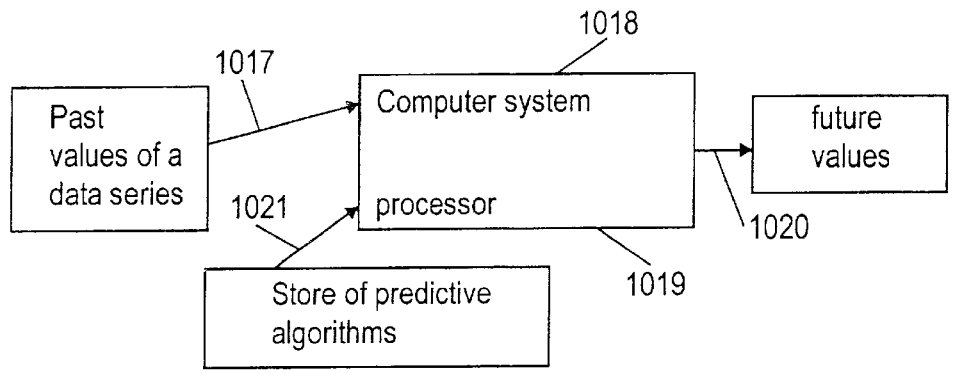
FIG. 21a is a schematic diagram of a computer system for predicting future values of a series of data.

The prediction method may be implemented on any suitable type of information processor or computer system. For example, FIG. 21a shows a computer system 1018 for predicting future values of a data series. An input 1017 is arranged to receive past values of the data series under examination. A processor 1019 assesses the level of deterministic behaviour of the data series on the basis of the input past values. Another input 1021 accesses a store of predictive algorithms, one of which is selected by the processor 1019 on the basis of the determined level of deterministic behaviour. The processor then carries out a prediction using the selected algorithm and predicted values are output 1020.

The audit process 1011 comprises one or more assessment methods. In the case that a plurality of assessment methods are used these are carried out in parallel and their results compared. Alternatively the assessment methods are used sequentially and the first method to give results which meet pre-specified criteria chosen.

The audit process 1011 is carried out in real time and its results are used in a type of "smart-switch" method for selecting an optimal algorithm from the algorithm bank that will give accurate predictions. In this way the prediction method is modified dynamically as changes in the data stream are observed.

Figure 28:
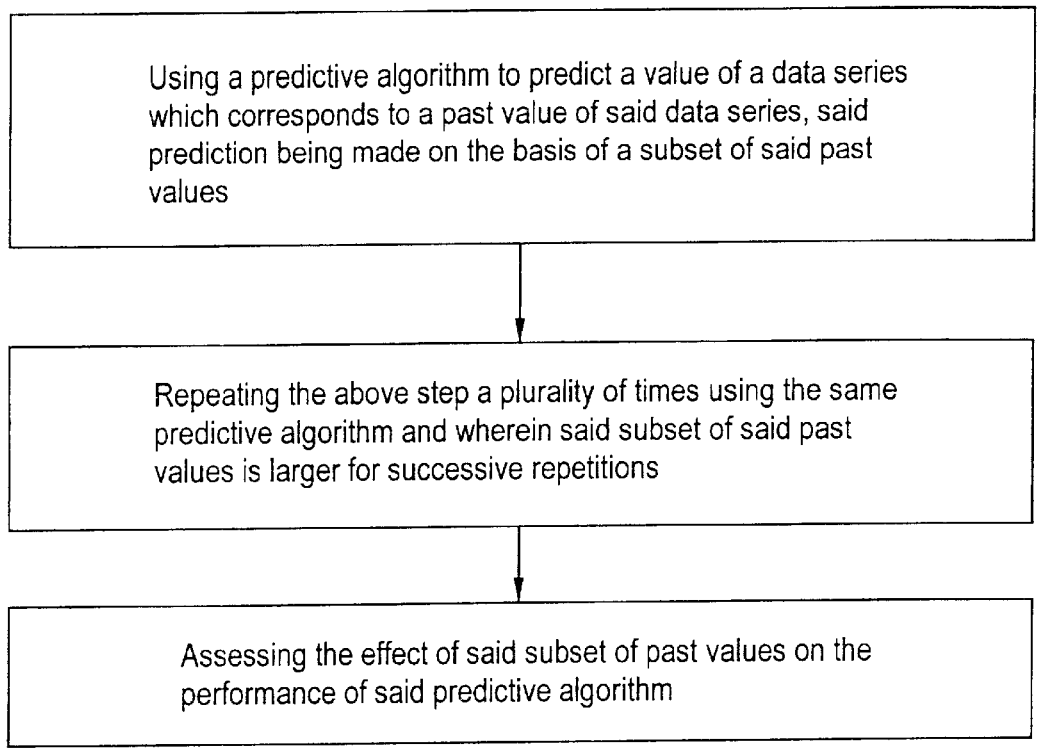
FIG. 28 is a flow diagram of a method of assessing a level of deterministic behaviour exhibited by a series of data.

Any suitable assessment methods may be used. FIG. 28 shows a flow diagram of an assessment method in general terms. Also, two examples of assessment methods are described below under the headings "matrix adjustments", "assessment of $R^2$", and "structure classification". Referring to FIG. 28, a method for assessing the level of deterministic behaviour of a data series comprises the following steps:

Using a predictive algorithm to predict a value of a data series which corresponds to a past value of said data series, said prediction being made on the basis of a subset of said past values (box 803 of FIG. 28)

Repeating the above step a plurality of times using the same predictive algorithm and wherein said subset of said past values is larger for successive repetitions (box 804 of FIG. 28)

Assessing the effect of said subset of past values on the performance of said predictive algorithm (box 805, FIG. 28).

Matrix Adjustments

Figures 22, 23:
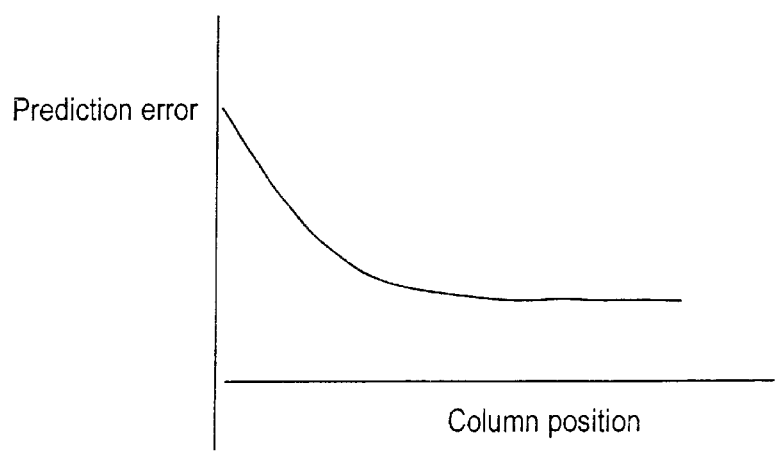
FIG. 22 is schematic representation of a matrix for use in a matrix adjustment method of assessing the complexity of a series of data.
FIG. 23 is a graph of prediction error against matrix column position.

A time delay τ and an embedding dimension m are determined in advance using values from the data stream. Any suitable method of determining the time delay and embedding dimension may be used and some examples are described below. In order to assess the complexity of the data stream 1010 using the method of matrix adjustments, the recent past results 1016 that are input to the processor are formed into a Takens matrix as illustrated in FIG. 22. The number of columns in the matrix is equal to the embedding dimension. The data are entered into the matrix as shown in FIG. 22 where τ is the chosen time delay.

In the example shown in FIG. 22 the time delay τ is 1. The first (oldest) item from the recent past results 1016 is represented by X1 in FIG. 21 and is placed in the top left cell of the matrix. The next item from the recent past results X2 is placed in the next cell in the top row and in this way the top row of the matrix is filled. The second row of the matrix is filled in the same manner, with the first cell in this row containing data item X2 and the last cell in this row data item X28. In this manner the matrix is filled. The number of rows in the matrix thus depends on the number of recent past data items 1016 that are available. In the case that the time delay value is say 5, then every fifth data item from the recent past results is used to form the matrix. For example, the item in the top left cell would be X1, and the next two items in the same row X6 and X11. In all cases, the most recent data item in the matrix is that contained in the bottom right most cell.

In order to predict a future value of the series of data the following steps are taken. The bottom row of the matrix is considered as a current vector. Each of the other rows in the matrix are also considered as vectors and the current vector compared with these to identify so called "nearest neighbour" vectors. Any suitable measure of similarity (such as Euclidean distance) between the current vector and each of the other vectors is calculated. If the measure of similarity is sufficient (for example, exceeds a pre-specified threshold level) then the vector concerned is deemed a nearest neighbour vector.

Each nearest neighbour vector is then projected forward by an integer multiple of the time delay. For example, in FIG. 22 suppose that three nearest neighbour vectors 201, 202, 203 are identified. Each of these is projected forward by one value of the time delay $\tau$. This means that the vector comprising the values in the row below each nearest neighbour vector is taken. Nearest neighbour vector 201 projects onto vector 201', 202 onto 202' and 203 onto 203'.

Then in order to obtain a single value for the predicted future value of the data series, the values in the right most column of the projected nearest neighbour vectors are combined. In the example illustrated in FIG. 22, values 204, 205 and 206 are combined to give predicted value 207.

An example of this method of prediction is described above in the section headed "Prediction method for data series which show deterministic behaviour".

The method of matrix adjustments involves using such a method of prediction but uses it to "predict" a plurality of data values that are already known. The error between the predicted and actual values is then determined and used to provide an assessment of the degree of complexity or the degree of deterministic behaviour exhibited by the series of data.

For example, using a matrix such as that in FIG. 22, a value 208 is predicted. This value is the next item in the penultimate column of the matrix. The actual value corresponding to this predicted value 208 is already known and appears in the matrix at cell 209, which is the last item in the right most column of the matrix.

In order to predict value 208, the method described above is used and the values in the penultimate column of the projected nearest neighbour vectors are combined to produce a single value. That is, the same nearest neighbour vectors are used as in the case where future value 207 is predicted. In this way the prediction of value 208 is not a true prediction because it makes use of some knowledge about "future" values of the series of data. That is, each nearest neighbour vector was determined using information in the right most column of the matrix, which, as far as predicted value 208 is concerned, constitutes knowledge about the future.

This process is repeated for a plurality of columns in the matrix to give predicted values 210, 211, 212 etc. The difference between each predicted value and its corresponding actual value is calculated and a graph of these error values against column position plotted as shown in FIG. 23.

Each predicted value is associated with a column in the matrix that is the column from which values in the projected nearest neighbour vectors were combined to produce that predicted value. Also, each column has a position that is a number of columns behind the right most column of the matrix. For a given predicted value, there is an associated column in the matrix and as the position of this column moves away from the right most column of the matrix, the more knowledge about "future" values of the data series was used to form that prediction. By determining the effect of increasing amounts of knowledge about "future" values of the data series on the predicted value, an assessment of the degree of deterministic behaviour exhibited by the data is obtained.

FIG. 23 shows a graph of prediction error against the column position of the column associated with each predicted value. The column position is measured in terms of the number of columns behind the right most column of the matrix. This column position gives an indication of the amount of knowledge about "future" values of the data series that was used to form the prediction. For data series which have deterministic behaviour, the graph of prediction error against column position has been found to have a form such as that shown in FIG. 23, in which the prediction error drops rapidly and then levels off around a certain value. That is, for such data series, only a small amount of knowledge of "future" values of the data series gives an improvement in predicted values of that data series. The more stochastic the data series, the greater amounts of knowledge of "future" values are observed to improve the predicted values. Thus by examining the form of the graph of prediction error against column position an indication of the degree of complexity or level of deterministic behaviour in the data series is obtained. In order to compare different examples of these graphs, the position of the first local minimum or other such parameters may be calculated.

Assessment of $R^2$

This method involves actually applying algorithms from the algorithm bank to the recent past data 1016 and then calculating a co-efficient of determination $R^2$ in each case. Any suitable method for calculating $R^2$ may be used as is known in the art. Each $R^2$ is a number between 0 and 1 calculated from the difference of two variances. The value of $R^2$ obtained provides an indicator of the accuracy of the prediction technique used. The bigger $R^2$ the more appropriate the particular prediction technique. Thus for an algorithm that is known to be suitable for data series exhibiting deterministic behaviour, then the value of $R^2$ provides an indication of the level of deterministic behaviour of the particular data series.

It is also possible to use other assessments of the accuracy of a particular prediction algorithm. For example, the root mean square error between the predicted and actual data values can be calculated.

Structure Classification

Using this assessment method past values of the series of data are formed into a matrix of delay vectors as illustrated in FIG. 22 and as described above. Data from the matrix is analysed using the method of principal component analysis as described in detail below. This provides three matrices, a matrix of eigenvectors, a diagonal matrix of eigenvalues and an inverse matrix of eigenvectors. The first three columns of the data from the matrix is taken and plotted to show the 3D structure of the data series as illustrated at 28 in FIG. 2. The 3D structure is then further revealed by transforming the first three columns of data from matrix 1022 using the eigenvectors and then plotting the transformed data, as shown at 29 in FIG. 2. FIGS. 24 to 27 are examples of such plots for different series of data. In each case the data series was obtained empirically and comprises product data.

Figure 24:
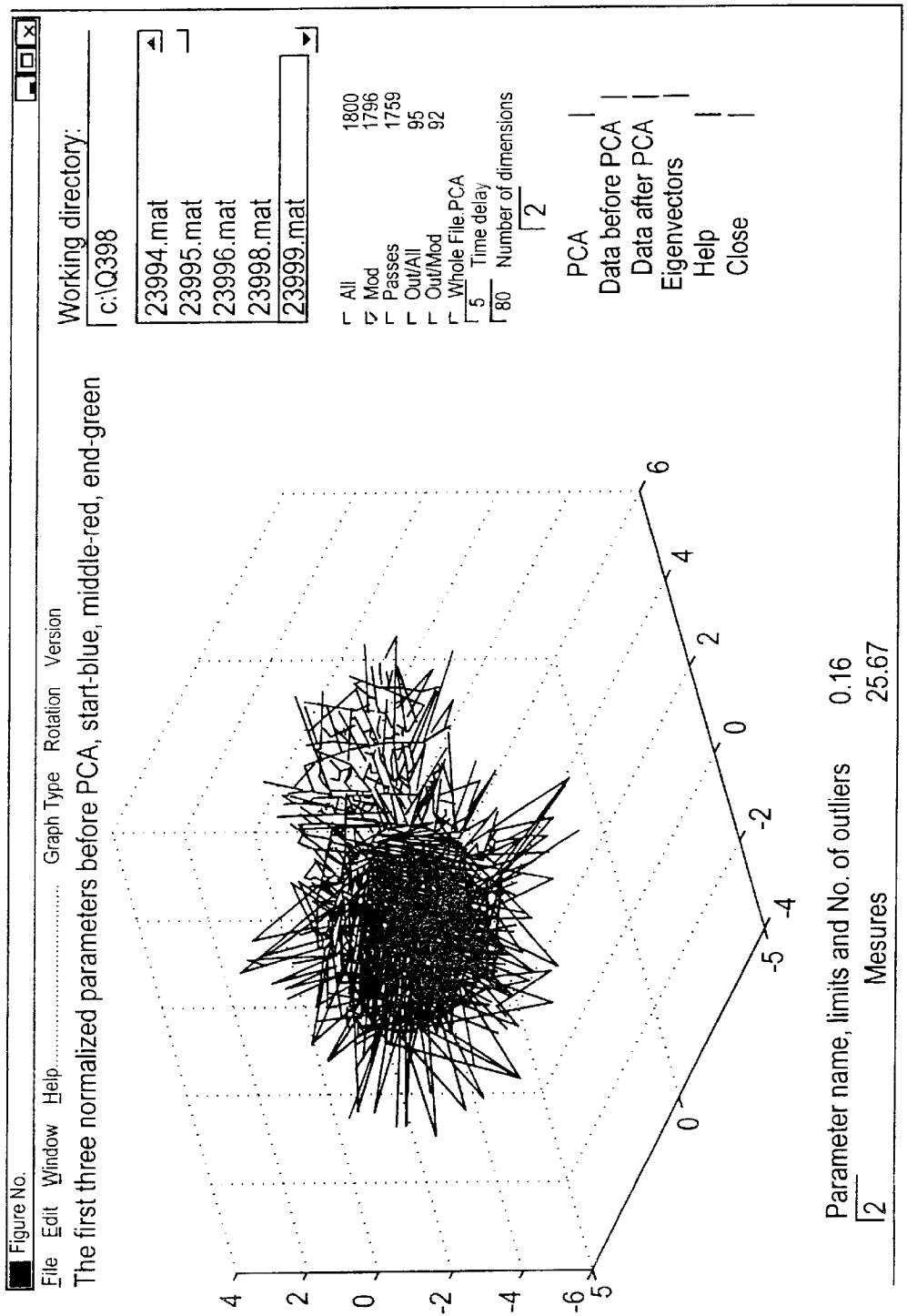
FIG. 24 is a graph of a series of data after principal component analysis in which the form of the graph indicates that the data series is generally stochastic.
Figure 26:
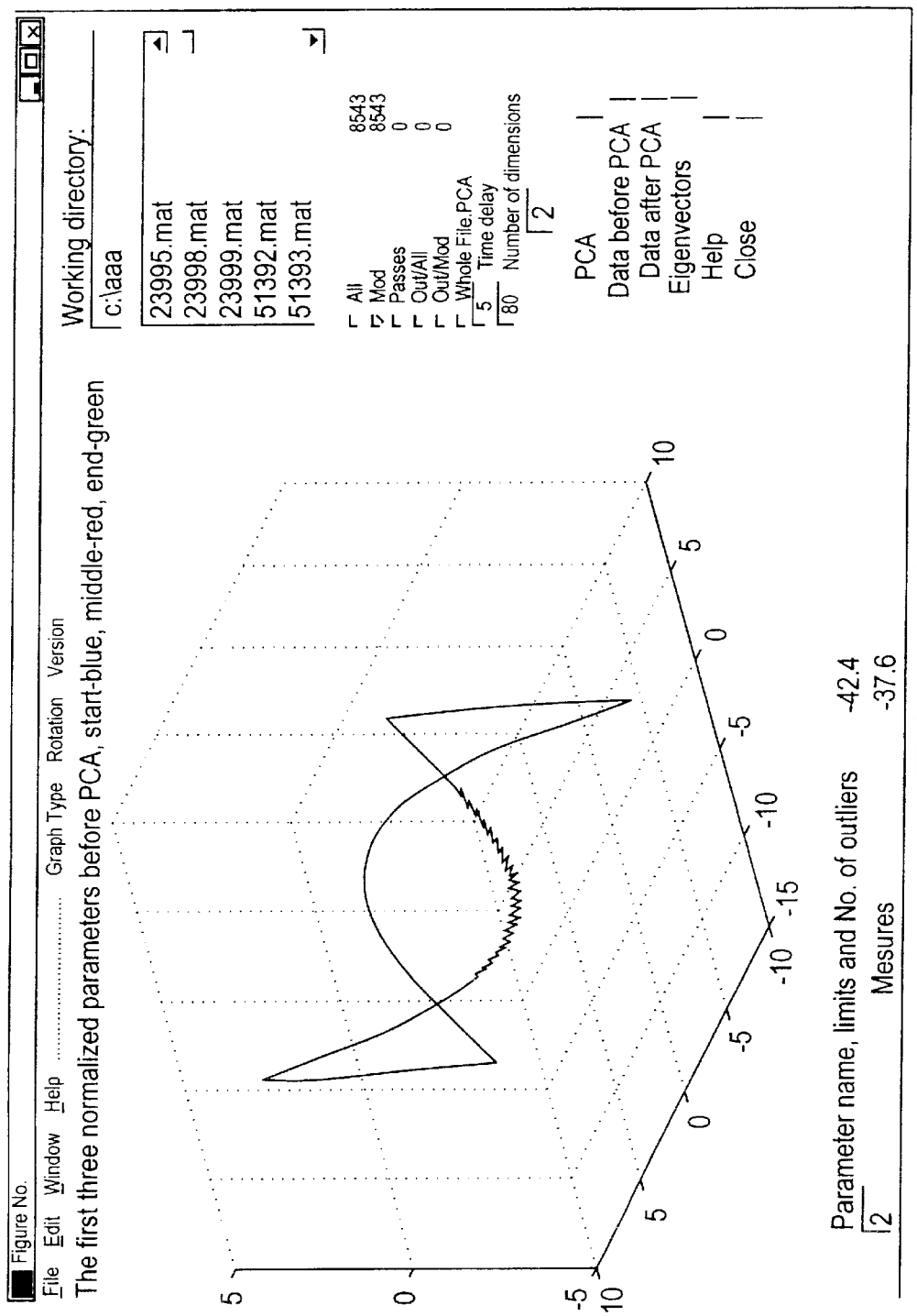
FIG. 26 is a graph of a series of data after principal component analysis in which the form of the graph indicates that the data series is generally deterministic.
Figure 27:
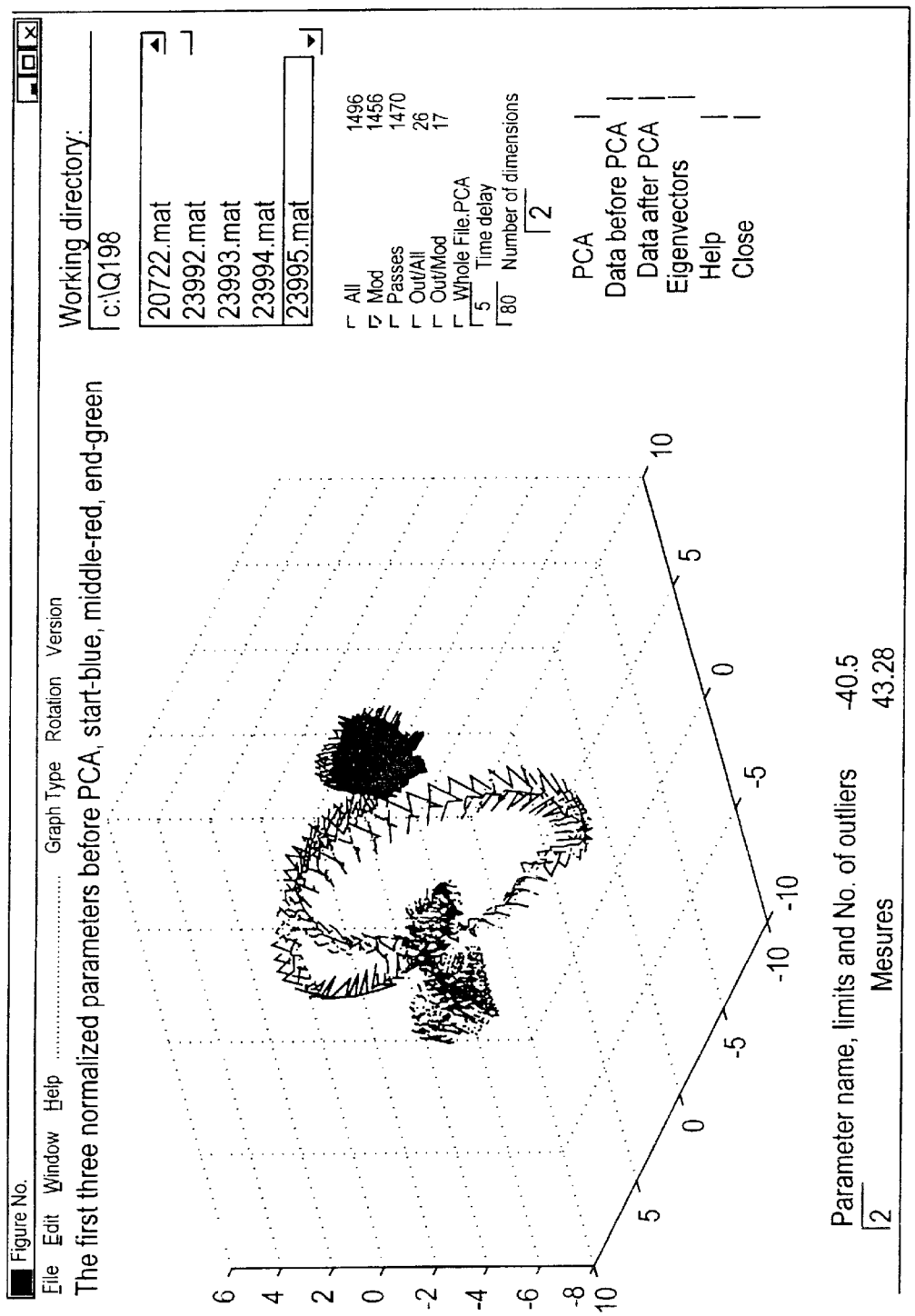
FIG. 27 is a graph of a series of data after principal component analysis in which the form of the graph indicates that the data series is generally deterministic.

FIG. 24 shows data that is stochastic in nature whilst FIGS. 25 to 27 show data that exhibits deterministic behaviour. In FIGS. 25 to 27 the data is shown to follow a path which retraces or re-orbits itself which is a characteristic of data series which show deterministic behaviour. However, in FIG. 24 the data is shown to have a more globular form which is characteristic of data series which are stochastic in nature.

Once the principal component analysis has been carried out and a plot such as those shown in FIGS. 25 to 27 obtained for a given series of data, the process of algorithm selection is carried out using a look-up table, neural network or other suitable selection system.

For example, in the case that a neural network system is used, inputs to that neural network comprise details of the results of the PCA and eigenvector transformation. These may be actual images of the graphs such as those in FIGS. 24 to 27 or may be any other suitable parameter values. The outputs of the neural network indicate either the degree of deterministic behaviour exhibited by a data series, or a simple "yes/no" output to indicate whether the data series is deterministic or not. Any suitable type of neural network, such as a multi-layer perceptron may be used as is known in the art. The neural network is first trained using data series which are known to exhibit different levels of deterministic or stochastic behaviour. It is also possible to use an associative neural network which is trained using pairs of data series and optimal prediction algorithms. In this case, inputs to the neural network comprise an image of a graph such as those shown in FIGS. 24 to 27 or any other suitable parameter values and the output comprises an indication of a suitable algorithm for use to predict future values of the particular data series.

An alternative method of making the selection involves analysing the graphs, such as those shown in FIGS. 4 to 7, to determine factors such as the amount of retracing or re-orbiting of the data. For example, methods similar to vector fields analysis may be used.

Another option is to compile a library or look-up table of graphs such as those shown in FIGS. 24 to 27 and their associated optimal prediction algorithms. For a given data series a graph is obtained such as those shown in FIGS. 24 to 27 and this graph compared with those contained in the look-up table. The most similar graph in the look-up table is chosen and the prediction algorithm associated with that entry in the look-up table selected.

Algorithm Bank

The algorithm bank contains many different algorithms which can be used for prediction of future values of data series. Some are better suited to stochastic processes, while others exploit any deterministic properties of the data and hence lend themselves to data which incorporates non-random components. Data streams can range from random based, where stochastic prediction systems are best, to non-linear determined systems inflicted with certain levels of noise, where deterministic algorithms perform better than stochastic prediction systems. Examples of algorithms that are stored in the algorithm bank are listed below. However, any other suitable algorithms may be used.

For Stochastic Data Series

Hidden Markov Models

Moving average methods

Auto regressive integrated moving average (ARIMA) methods—These were first developed by Box and Jenkins in their publication "Time Series Analysis: Forecasting and Control" First Edition 1970, San Francisco, Holden-Day, Inc. Since this publication the terms Box-Jenkins models and ARIMA models have become synonymous. Walter Vandaele in his book "Applied Time Series and Box-Jenkins Models" 1983 Academic Press, Inc. presents the Box-Jenkins models in an applied way.

Interpolation—The method of interpolation involves selecting n last samples, say 20 last samples, and fitting a polynomial through those last samples and then progressing the fitted polynomial into the future.

For Deterministic Data Series:

The method described above in the section headed "Prediction method for data series which show deterministic behaviour".

Appendix A

A method for determining false nearest neighbours is described below:

In dimension m each vector $$\{x_1\} = \{(x_1, x_{1+\tau}, x_{1+2\tau}, \ldots, x_{1+(m-1)\tau})\}$$

has a nearest neighbour $x_i^{NN}$ with nearness in the sence of some distance function. Abarbanel used Euclidean distance. The Euclidean distance in dimension m between $x_i$ and $x_i^{NN}$ is called $R_m(i)$:

$$R_m(i)^2 = \{[x_i - x_i^{NN}]^2 + [x_{i+\tau} - x_{i+\tau}^{NN}]^2 + \ldots + [x_{i+(m-1)\tau} - x_{i+(m-1)\tau}^{NN}]^2\}$$

$R_m(i)$ is presumably small when one has a lot of data and for a data set with N samples, this distance is approximately of order $(1/N)^{1/m}$. In dimension m+1 the nearest neighbour distance is a change due to the (m+1)st coordinates $x_{i+m\tau}$ and $$x_{i+m\tau}^{NN}$$

to $$R_{m+1}(i)^2 = R_m(i)^2 + [x_{i+m\tau} - x_{i+m\tau}^{NN}]^2$$

If $R_{m+1}(i)$ is large and $R_m(i)$ was small, we can presume that it is because the nearest neighbours were unprojected away from each other, when we increased dimension from m to m+1. The question is how to decide which neighbours are false. Abarbanel suggested the threshold size $R_T$:

$$\frac{|x_{i+m\tau} - x_{i+m\tau}^{NN}|}{R_m(i)} > R_T$$

and then the nearest neighbours are declared false. He reported that in the range of values $10 \leq R_T \leq 50$ the number of false neighbours identified by this criterion is constant.

$$\frac{\sqrt{R_{m+1}(i)^2 - R_m(i)^2}}{R_m(i)} \geq (10 \div 50)$$

With such a big range of independence of $R_T$ we have confidence that this is a workable criterion. The results are normally presented in precentage of all samples N.

In the case of clean data (pure data without any additional noise) from a chaotic system, we expect that the percentage of false nearest neighbours will start from 100% in dimension one and then will qickly drop to zero, when the embedding dimension m is reached. Furthermore, it should remain zero because the attractor is already unfolded.

What is claimed is:

1. A method of predicting a future value of a series of communications data comprising at least some data measured at irregular time intervals comprising the steps of:
   (i) forming a set of vectors wherein each vector comprises a number of successive values of the series of data;
   (ii) identifying from said set of vectors, a current vector which comprises a most recent value of the series of data;
   (iii) identifying at least one nearest neighbour vector from said set of vectors, wherein for each nearest neighbour vector a measure of similarity between that nearest neighbour vector and the current vector is less than a threshold value;
   (iv) for each nearest neighbour vector, determining a corresponding vector, each corresponding vector comprising values of the series of data that are a specified number of data values ahead of the data values of the nearest neighbour vector in said series of data; and
   (v) calculating the predicted future value on the basis of at least some of the corresponding vector(s).

2. A method as claimed in claim 1 wherein said step (i) of forming a set of vectors further comprises determining an interval value, said interval value being an integer.

3. A method as claimed in claim 2 wherein said interval value is determined on the basis of a local minimum in a graph of autocorrelation function.

4. A method as claimed in claim 2 wherein said interval value is determined on the basis of a local minimum in a graph of average mutual information.

5. A method as claimed in claim 2 wherein said interval value is determined on the basis of a phase portrait.

6. A method as claimed in claim 2 wherein each vector in said set of vectors comprises values that occur at a position in the series that is a fixed number of values along in said series from the values of one other vector of the set, and wherein said fixed number of values is said interval value.

7. A method as claimed in claim 1 wherein said step (i) of forming a set of vectors further comprises determining how many vectors are required for said set of vectors.

8. A method as claimed in claim 7 wherein said number of required vectors is determined using a method of principal component analysis.

9. A method as claimed in claim 7 wherein said number of required vectors is determined using a method of saturation of system invariants.

10. A method as claimed in claim 7 wherein said number of required vectors is determined on the basis of false nearest neighbour vectors.

11. A method as claimed in claim 7 wherein said number of required vectors is determined on the basis of true vector fields.

12. A method as claimed in claim 1 wherein two or more corresponding vectors are determined and said step (v) of calculating the predicted future value comprises calculating an average of said corresponding vectors.

13. A method as claimed in claim 12 wherein said average is a weighted average.

14. A method as claimed in claim 1 wherein said step (v) of calculating the predicted future value further comprises the steps of:
   a) for each nearest neighbour vector, determining a second corresponding vector, each second corresponding vector comprising values of the series of data that are said specified number of data values behind the data values of the nearest neighbour vector in said series of data; and
   b) determining a set of second corresponding vectors for which a measure of similarity between each second corresponding vector and a particular vector is less than a threshold value; and
   c) calculating the predicted future value only on the basis of corresponding vectors for which the nearest neighbour vector has a second corresponding vector that is a member of said set of second corresponding vectors.

15. A method as claimed in claim 1 wherein said series of data comprise a number of measured values of a single parameter.

16. A method as claimed in claim 1 wherein said series of data comprise values that were measured over time.

17. A method as claimed in claim 1 wherein said measure of similarity comprises a distance.

18. A method as claimed in claim 1 wherein said predicted future value of the series of values is between 1 and 50 values ahead in the series.

19. A method as claimed in claim 1 wherein said predicted future value of the series of values is between 1 and 15 values ahead in the series.

20. A method as claimed in claim 1 wherein said step (v) of calculating the predicted future value further comprises obtaining an actual value corresponding to the predicted value and comparing said actual value with said predicted value.

21. A computer program stored on a computer readable medium, said computer program being arranged to control a computer system for predicting one or more future values of a series of data, said computer program being arranged to control said computer system such that:
   (i) a plurality of past values of said series of data is accepted;
   (ii) an assessment of the level of deterministic behaviour of said series of data is made on the basis of said selected plurality of past values;
   (iii) a store of predictive algorithms is accessed and one of said predictive algorithms selected on the basis of said assessment of the level of deterministic behaviour of the series of data; and
   (iv) one or more future values of the series of data are obtained by using said selected predictive algorithm.

22. A computer system for predicting a future value of a series of communications data comprising at least some data measured at irregular time intervals comprising:
   (i) a processor arranged to form a set of vectors wherein each vector comprises a number of successive values of the series of data;
   (ii) an identifier arranged to identify from said set of vectors, a current vector which comprises a most recent value of the series of data;
   (iii) a second identifier arranged to identify at least one nearest neighbour vector from said set of vectors, wherein for each nearest neighbour vector a measure of similarity between that nearest neighbour vector and the current vector is less than a threshold value;
   (iv) a determiner arranged to determine, for each nearest neighbour vector, a corresponding vector, each corresponding vector comprising values of the series of data that are a specified number of data values ahead of the data values of the nearest neighbour vector in said series of data; and (v) a calculator arranged to calculate the predicted future value on the basis of at least some of the corresponding vector(s).

23. An apparatus for controlling a communications process comprising:
   (i) one or more inputs arranged to receive a series of communications data measured at irregular time intervals and associated with the communications process; and
   (ii) a computer system for predicting at least one future value of said series of data said computer system comprising:
      a processor arranged to form a set of vectors wherein each vector comprises a number of successive values of the series of data;
      an identifier arranged to identify from said set of vectors, a current vector which comprises a most recent value of the series of data;
      a second identifier arranged to identify at least one nearest neighbour vector from said set of vectors, wherein for each nearest neighbour vector a measure of similarity between that nearest neighbour vector and the current vector is less than a threshold value.

24. A computer system for predicting one or more future values of a series of data, said computer system comprising:
   (i) an input arranged to accept a plurality of past values of said series of data;
   (ii) a processor arranged to assess the level of deterministic behaviour of said series of data on the basis of said selected plurality of past values;
   (iii) an input arranged to access a store of predictive algorithms and wherein said processor is further arranged to select one of said predictive algorithms on the basis of said assessment of the level of deterministic behaviour of the series of data; and
   (iv) an output arranged to provided one or more future values of the series of data obtained by using said selected predictive algorithm.

25. A communications network comprising a computer system as claimed in claim 24.

26. A method of assessing a level of deterministic behaviour of a series of communications data comprising at least some data measured at irregular time intervals comprising the steps of:
   (i) using a predictive algorithm to predict a value of said data series which corresponds to a past value of said data series, said prediction being made on the basis of a subset of said past values;
   (ii) repeating said step (i) immediately above a plurality of times using the same predictive algorithm and wherein said subset of said past values is larger for successive repetitions of said step (i); and
   (iii) assessing the effect of the size of said subset of past values on the performance of said predictive algorithm.

27. A computer system for assessing a level of deterministic behaviour of a series of communications data comprising at least some data measured at irregular time intervals said computer system comprising:
   (i) a processor arranged to use a predictive algorithm to predict a value of said data series which corresponds to a past value of said data series, said prediction being made on the basis of a subset of said past values; and
   (ii) wherein said processor is further arranged to repeat said step (i) immediately above a plurality of times using the same predictive algorithm and where said subset of said past values is larger for successive repetitions of said step (i); and
   (iii) wherein said processor is further arranged to assess the effect of the size of said subset of past values on the performance of said predictive algorithm.

28. A method of predicting one or more future values of a series of data, said method comprising the steps of:
   (i) selecting a plurality of past values of said series of data;
   (ii) assessing the level of deterministic behaviour of said series of data on the basis of said selected plurality of past values;
   (iii) selecting a predictive algorithm from a store of predictive algorithms on the basis of said assessment of the level of deterministic behaviour of the series of data; and
   (iv) using said selected predictive algorithm to predict said one or more future values of the series of data.

29. A method as claimed in claim 28 wherein said step (ii) of assessing the level of deterministic behaviour of the series of data comprises substantially determining an attractor structure from said past values.

30. A method as claimed in claim 29 wherein said step (ii) of assessing the level of deterministic behaviour of the series of data further comprises inputting details about said determined attractor structure to a neural network.

31. A method as claimed in claim 28 wherein said step (ii) of assessing the level of deterministic behaviour of the series of data further comprises, applying one of the predictive algorithms from said store to a plurality of the past values to determine predicted values which correspond to others of the past values, and determining a measure of the accuracy of said predicted values.

32. A method as claimed in claim 31 wherein said measure of the accuracy of said predicted values comprises a co-efficient of determination.

33. A method as claimed in claim 28 wherein said step of assessing the level of deterministic behaviour comprises:
   (i) Using a predictive algorithm from said store to predict a value of said data series which corresponds to a past value of said data series, said prediction being made on the basis of a subset of said past values; and
   (ii) Repeating said step (i) immediately above a plurality of times using the same predictive algorithm and wherein said subset of said past values is larger for successive repetitions of said step (i).

34. A method as claimed in claim 33 which further comprises the step of calculating the differences between said predicted values and said corresponding past values and plotting a graph of said differences against an indication of the size of said subset of past values.

35. A method as claimed in claim 34 which further comprises the step of determining the location of a first local minimum of said graph.

36. A method as claimed in claim 33 wherein said prediction algorithm is suitable for data series which exhibit deterministic behaviour.

37. A method as claimed in claim 33 wherein said prediction algorithm comprises the steps of:
   (i) forming a set of vectors wherein each vector comprises a plurality of successive past values of the series of data;
   (ii) identifying from said set of vectors, a current vector which comprises a most recent value of the series of data within said vectors;
   (iii) identifying at least one nearest neighbour vector from said set of vectors, wherein for each nearest neighbour vector a measure of similarity between that nearest neighbour vector and the current vector is less than a threshold value;

(iv) for each nearest neighbour vector, determining a corresponding vector, each corresponding vector comprising values of the series of data that are a specified number of data values ahead of the data values of the nearest neighbour vector in said series of data; and (v) calculating a predicted value on the basis of at least some of the corresponding vector(s).

38. A method as claimed in claim 28 wherein said store of predictive algorithms comprises at least one auto regressive integrated moving average (ARIMA) algorithm.

39. A method as claimed in claim 28 wherein said step (ii) of assessing the level of deterministic behaviour of said series of data on the basis of said selected plurality of past values is carried out in real time.

40. A method as claimed in claim 28 wherein said step (iii) of selecting a predictive algorithm from a store of predictive algorithms on the basis of said assessment of the level of deterministic behaviour of the series of data is carried out in real time.

41. A method as claimed in claim 28 which further comprises the step of repeating said steps (i) of selecting past values and said step (ii) of assessing the level of deterministic behaviour, and, if the results of said assessment differ substantially from the results of the previous assessment, then repeating said steps (iii) and (iv).

42. A method as claimed in claim 28 wherein said series of data comprises values observed at irregular time intervals.

43. A method of controlling a product manufacturing process comprising (i) obtaining a series of product data values from products produced in said manufacturing process;

(ii) predicting one or more future values of said series of product data values using the method claimed in claim 28;

(iii) adjusting said product manufacturing process on the basis of said one or more predicted future values.

44. A method of managing a communications network comprising the steps of:

(i) obtaining a series of communications data values from said communications network;

(ii) predicting one or more future values of said series of communications data values using the method claimed in claim 28; and (iii) managing said communications network on the basis of said one or more predicted future values.

* * * * *